United States Patent [19]

Yaegashi et al.

[11] Patent Number: 5,270,730
[45] Date of Patent: Dec. 14, 1993

[54] JET RECORDING METHOD AND APPARATUS FOR DISCHARGING NORMALLY SOLID RECORDING MATERIAL BY CAUSING GENERATED BUBBLE TO COMMUNICATE WITH AMBIENCE

[75] Inventors: Hisao Yaegashi; Yoshihisa Takizawa, both of Kawasaki; Katsuhiro Shirota, Inagi, all of Japan

[73] Assignee: Canon Kabushiki Kaisha, Tokyo, Japan

[21] Appl. No.: 767,686

[22] Filed: Sep. 30, 1991

[30] Foreign Application Priority Data

| Sep. 29, 1990 | [JP] | Japan | 2-261669 |
| Apr. 26, 1991 | [JP] | Japan | 3-097251 |
| Aug. 2, 1991 | [JP] | Japan | 3-194107 |
| Aug. 12, 1991 | [JP] | Japan | 3-225363 |

[51] Int. Cl.⁵ .......................... B41J 2/05; C09D 11/02
[52] U.S. Cl. ................................ 346/1.1; 106/20 D; 106/22 A; 106/31 R
[58] Field of Search .................... 346/1.1, 140 R; 106/23 A, 20 D, 22 A, 31 R

[56] References Cited

U.S. PATENT DOCUMENTS

| 4,334,234 | 6/1982 | Shirato | 346/140 R |
| 4,338,611 | 7/1982 | Eida | 346/140 X |
| 4,410,899 | 10/1983 | Haruta et al. | 346/140 R |
| 4,490,731 | 12/1984 | Vaught | 346/140 R |
| 4,607,266 | 8/1986 | DeBonte . | |
| 4,638,337 | 1/1987 | Torpey | 346/140 R |
| 4,684,956 | 8/1987 | Ball | 346/140 X |
| 4,723,129 | 2/1988 | Endo et al. | 346/140 R X |
| 5,006,170 | 4/1991 | Schwartz et al. . | |
| 5,124,718 | 6/1992 | Koike | 346/140 R X |

FOREIGN PATENT DOCUMENTS

| 0315406 | 5/1989 | European Pat. Off. . |
| 0454155 | 10/1991 | European Pat. Off. . |
| 54-161935 | 12/1979 | Japan . |
| 55-54368 | 4/1980 | Japan . |
| 58-108271 | 6/1983 | Japan . |
| 59-214659 | 12/1984 | Japan . |
| 61-83268 | 4/1986 | Japan . |
| 61-159470 | 7/1986 | Japan . |
| 61-185455 | 8/1986 | Japan . |
| 61-197246 | 9/1986 | Japan . |
| 61-249768 | 11/1986 | Japan . |
| 62-48774 | 3/1987 | Japan . |
| 1-236287 | 9/1989 | Japan . |
| 1-242672 | 9/1989 | Japan . |
| 1-263170 | 10/1989 | Japan . |
| 1-263171 | 10/1989 | Japan . |
| 2-51570 | 2/1990 | Japan . |

*Primary Examiner*—Joseph W. Hartary
*Attorney, Agent, or Firm*—Fitzpatrick, Cella, Harper & Scinto

[57] ABSTRACT

A normally solid recording material is heat-melted in a path defined by a nozzle leading to an ejection outlet and is imparted with a thermal energy from a heater corresponding to a recording signal to generate a bubble. As a result, a droplet of the recording material is ejected out of the ejection outlet under the action of the bubble while the bubble is caused to communicate with ambience. The normally solid recording material preferably contains a colorant, a first heat-fusible solid substance having a melting point Tm of 36°-150° C. and a boiling point Tb of 150°-370° C., and a second heat-fusible solid substance having a melting point Tm and a solidifying point Tf satisfying a relationship of $Tm - Tf \leq 30°$ C. The distance between the heater and the ejection outlet, the sectional size of the nozzle and the thermal energy imparted by the heater are controlled to cause the bubble to communicate with ambience.

20 Claims, 16 Drawing Sheets

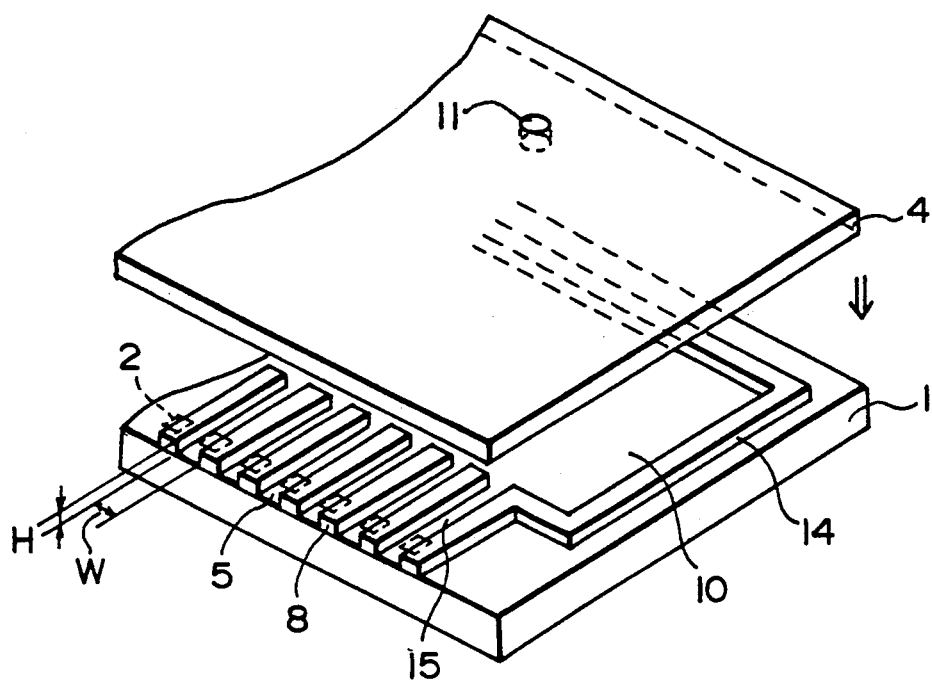
F I G. 2A
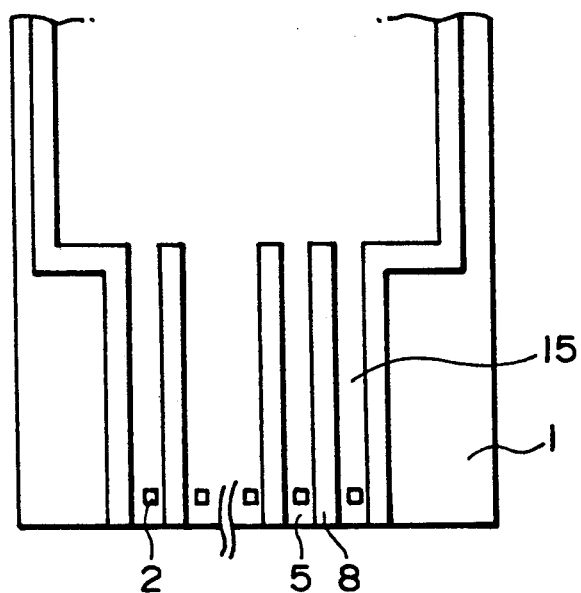
F I G. 2B

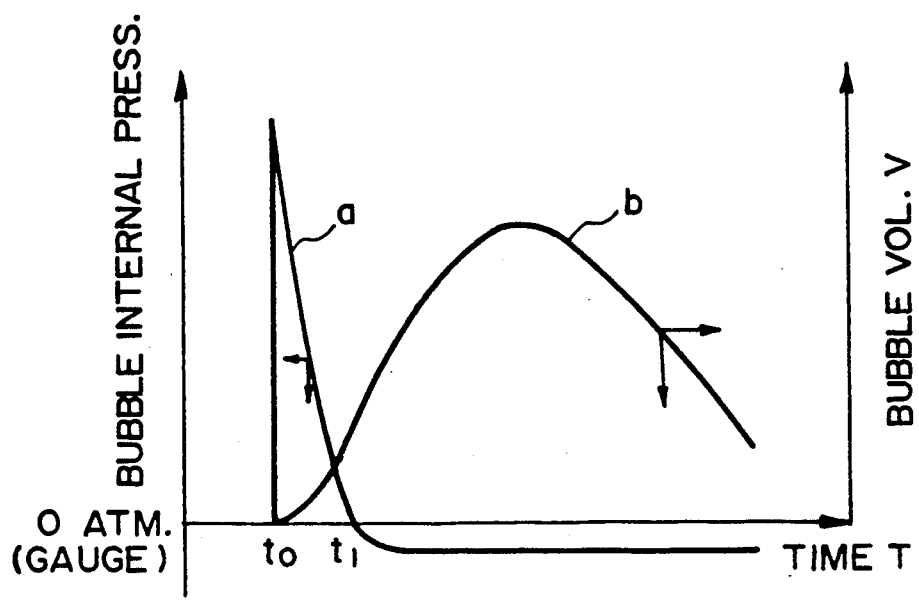
F I G. 4
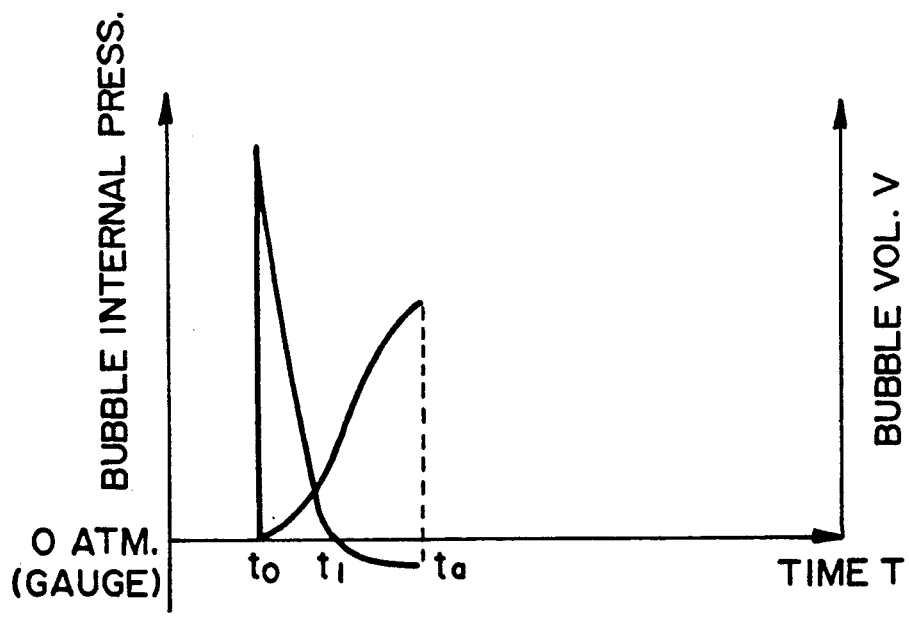
F I G. 5

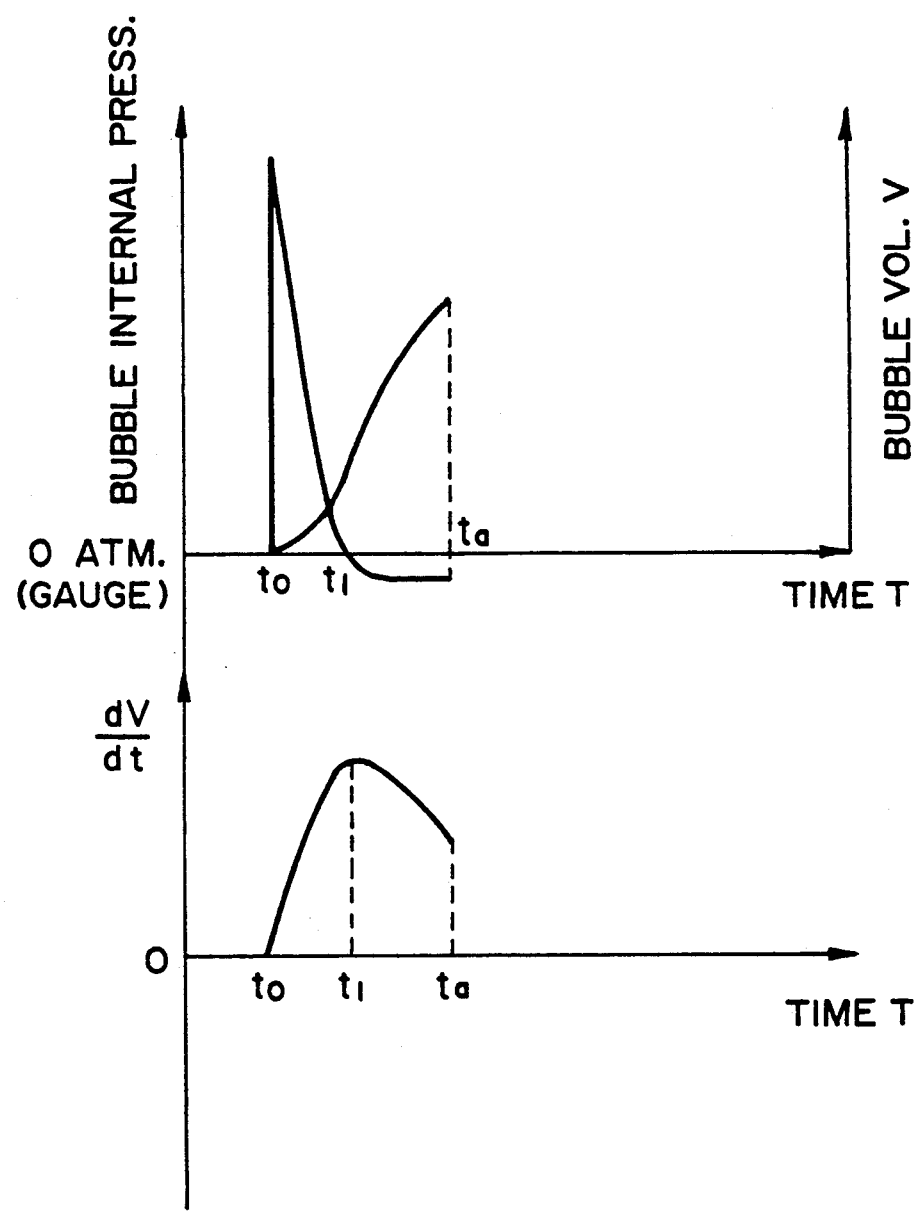
F I G. 6

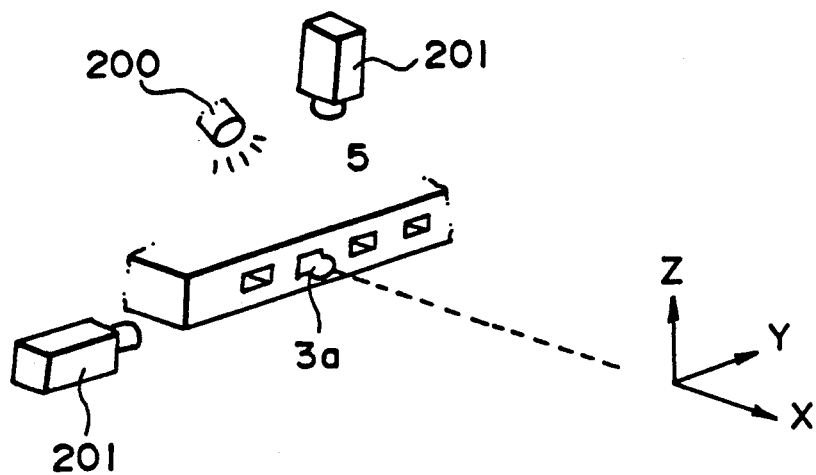
FIG. 7
FIG. 8(a)
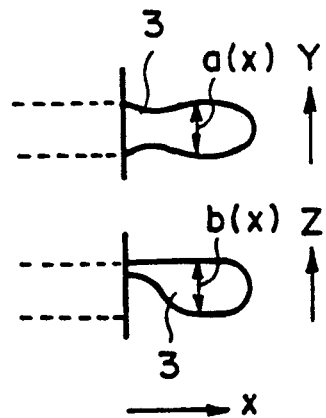
FIG. 8(b)
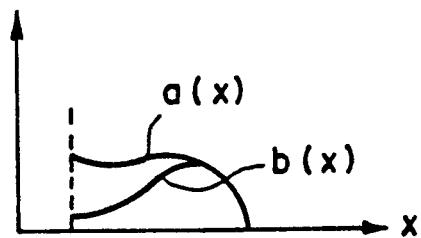
FIG. 8(c)

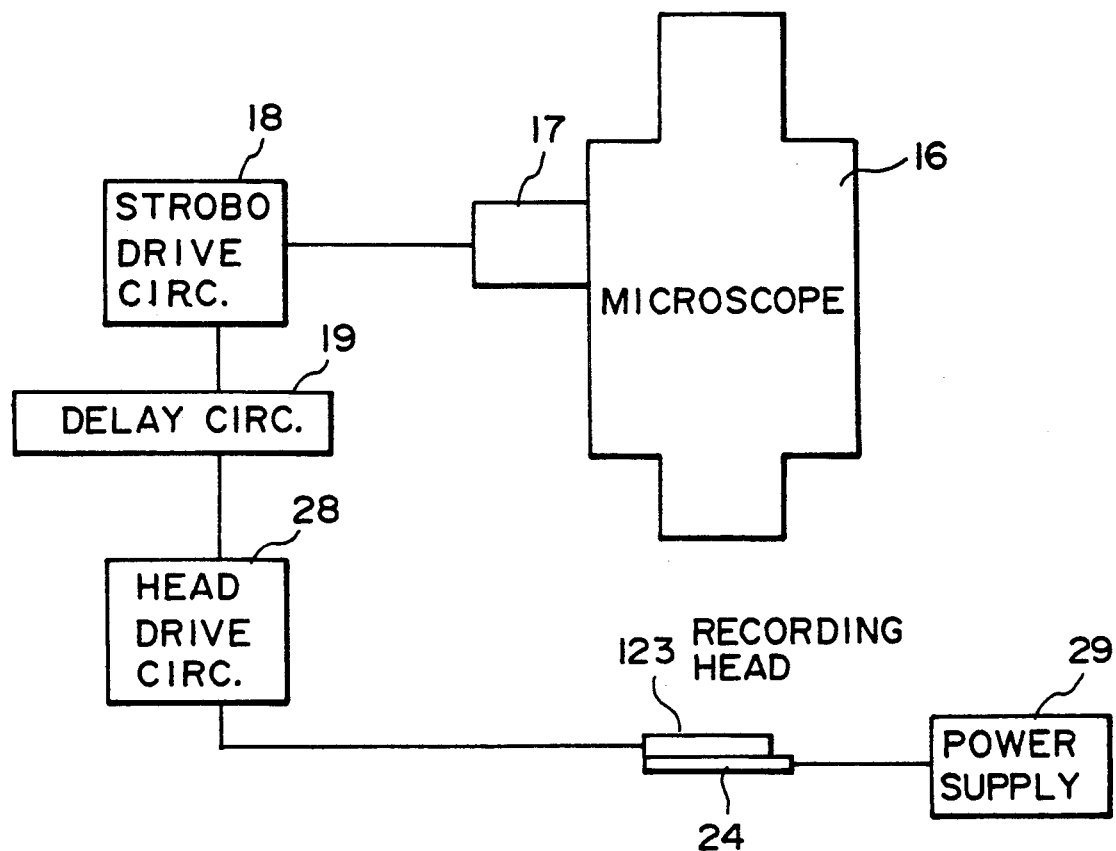
F I G. 10

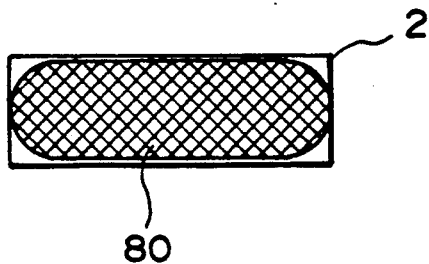
F I G. 11
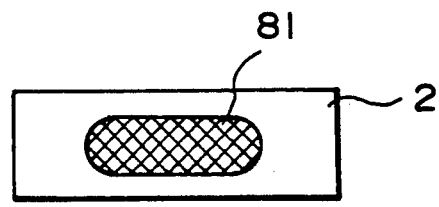
F I G. 12
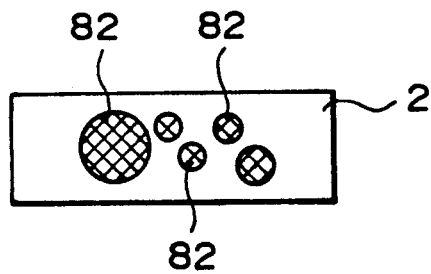
F I G. 13

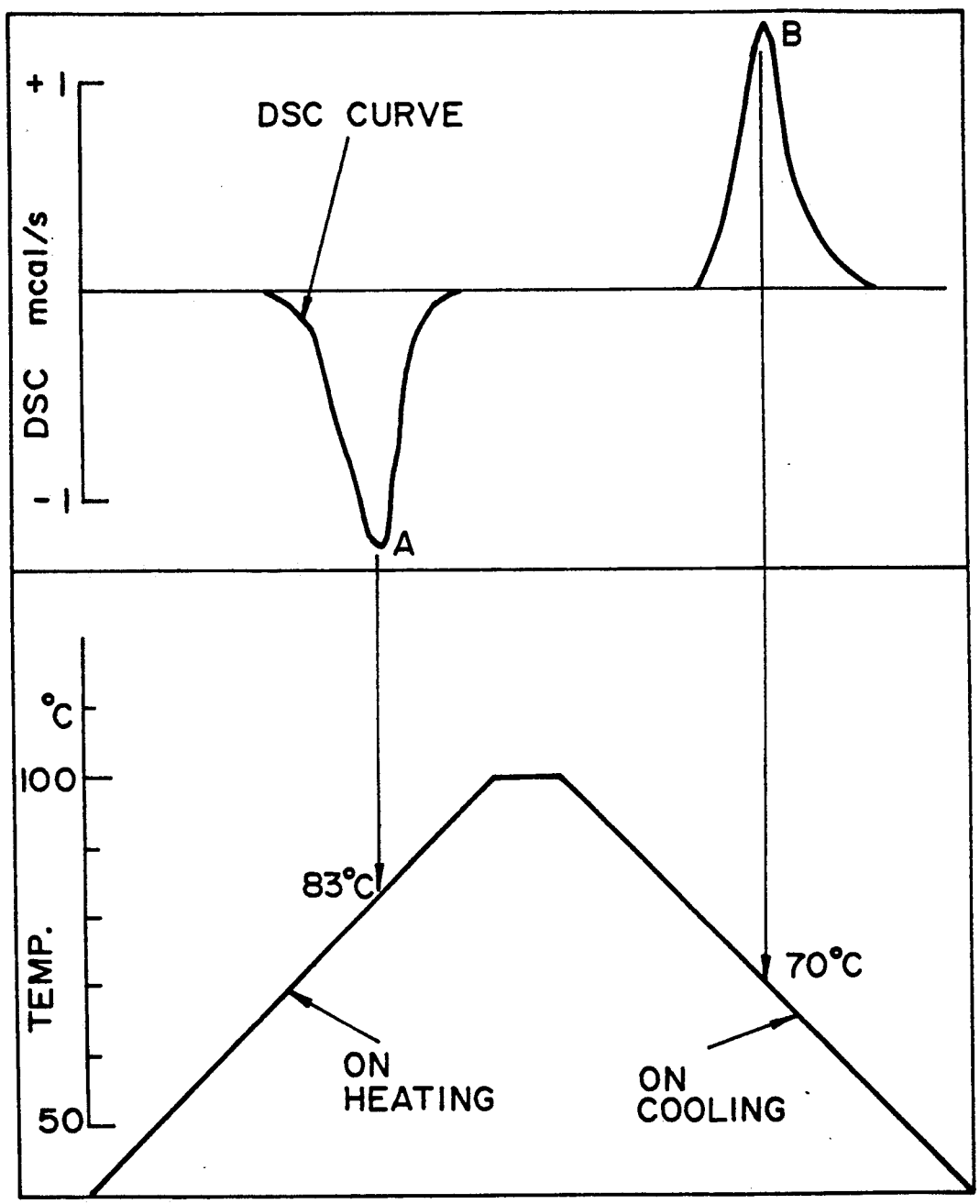
F I G. 14

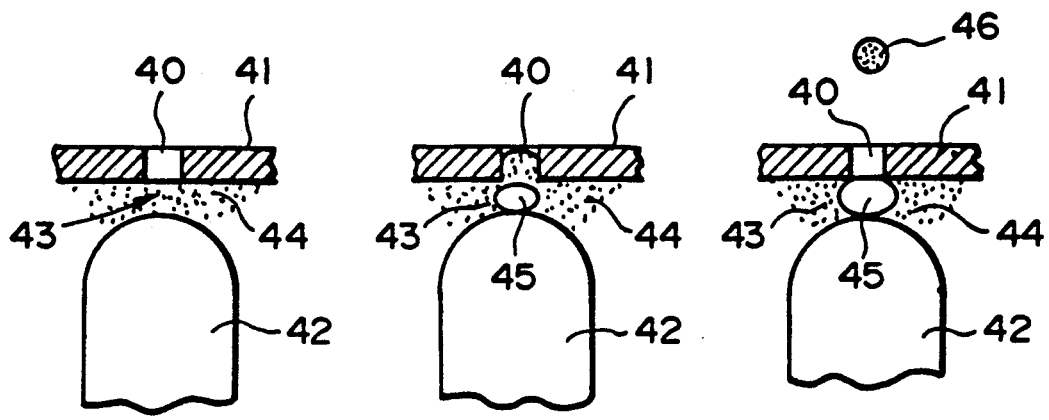
FIG. 23A
PRIOR ART
FIG. 23B
PRIOR ART
FIG. 23C
PRIOR ART
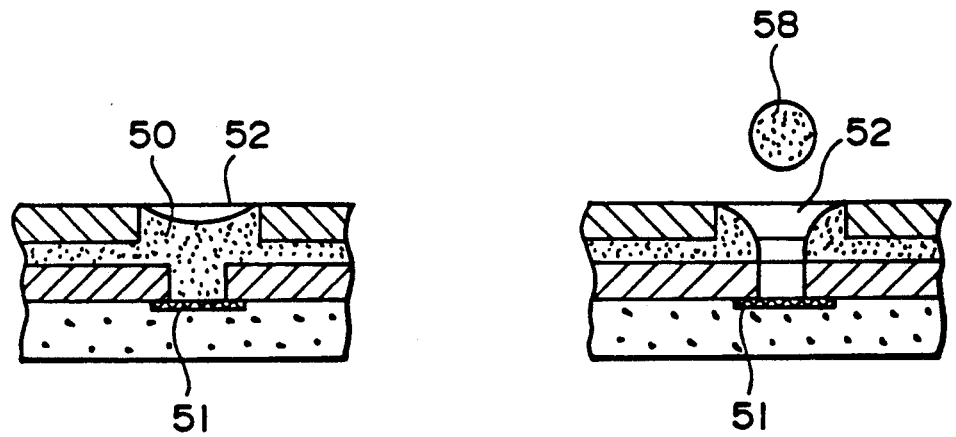
FIG. 24A
PRIOR ART
FIG. 24B
PRIOR ART

JET RECORDING METHOD AND APPARATUS FOR DISCHARGING NORMALLY SOLID RECORDING MATERIAL BY CAUSING GENERATED BUBBLE TO COMMUNICATE WITH AMBIENCE

FIELD OF THE INVENTION AND RELATED ART

The present invention relates to a jet recording method wherein a normally solid recording material (i.e., a recording material or ink which is solid at room temperature (but can be liquid at an elevated temperature)) is discharged or ejected to a recording medium, such a normally solid recording material and a recording apparatus for use in the recording method.

In the jet recording method, droplets of a recording material (ink) are ejected to be attached to a recording medium such as paper for accomplishing recording. In the method disclosed in U.S. Pat. Nos. 4,410,899, 4,723,129 and 4,723,129 assigned to the present assignee among the known jet recording methods, a normally liquid ink is used, a bubble is generated in the ink by applying a heat energy to the ink, and an ink droplet is ejected through an ejection outlet (orifice), whereby a recording head provided with high-density multi-orifices can be easily realized to record a high-quality image having a high resolution at a high speed.

In addition to the above, known liquid jet recording methods may include the following.

Japanese Laid-Open Patent Application (JP-A) 161935/1979 discloses a recording method as illustrated in FIG. 22 of the present specification, wherein a liquid ink 31 in a chamber is gasified by operation of a heater 30 energized through electrodes 35, and the resultant gas 32 is ejected together with an ink droplet 33 through an ejection outlet. It is said that the plugging of an orifice can be prevented due to ejection of the gas 32 through a nozzle.

JP-A 185455/1986 discloses a recording method as illustrated in FIGS. 23A–23C, wherein a liquid ink 44 filling a minute gap 43 between a plate member 41 having a pore 40 and a heat-generating head 42 is heated by the head 42 (FIGS. 23A and 23B), and an ink droplet 46 is ejected by the created bubble 45 through the pore 40 together with the gas constituting the bubble (FIG. 23C) to form an image on recording paper.

JP-A 249768/1986 discloses a recording method as illustrated in FIGS. 24A and 24B, wherein a liquid ink 50 is supplied with a heat energy by a heating member 51 to form a bubble, and an ink droplet 58 is ejected by expansion force of the bubble together with the gas constituting the bubble through a large aperture to the ambience.

JP-A 197246/1986 discloses a recording method as illustrated in FIG. 25, wherein ink 62 filling a plurality of bores 61 formed in a film 60 is heated by a recording head 64 having a heating element 63 to generate a bubble 67 in the ink 62, thus ejecting an ink droplet 65 onto a recording medium 66 (at (a)–(f) in order in FIG. 25).

The inks used in the jet recording method are required to satisfy contradictory properties that they are quickly dried to be fixed on the recording medium but they do not readily plug a nozzle due to drying in the nozzle.

For complying with the requirements, the conventional normally liquid inks generally comprise water as a principal constituent and also contain a water-soluble high-boiling solvent, such as a glycol, for the purposes of preventing drying and plugging, etc. When such inks are used for recording on plain paper, there are encountered several problems such that the inks are not quickly dried to be fixed and the ink image immediately after the printing is liable to be attached to hands on touching and smeared to lower the printing quality.

Further, the ink penetrability remarkably varies depending on the kind of recording paper, so that only special paper is usable when such conventional aqueous inks are used. In recent years, however, it is required to perform good recording on so-called plain paper, inclusive of copy paper, report paper, note book paper and letter paper.

In order to solve the above problems, there have been disclosed jet recording methods wherein a normally solid hot melt-type ink is heat-melted to be emitted in U.S. Pat. No. 5,006,170, JP-A 108271/1983, JP-A 83268/1986, JP-A 159470/1986, JP-A 48774/1987 and JP-A 54368/1980.

However, a normally solid ink, even if heat-melted, has a viscosity higher than a normally liquid aqueous ink to provide a large resistance to generation and expansion of bubbles. For this reason, in the conventional jet recording method using a normally solid ink, a sufficient ejection energy cannot be attained to result in a slow ink ejection speed or irregular shapes of bubbles result even if bubbles are created in the ink. As a result, the ink droplet is not attached at a high accuracy to a prescribed position on the recording medium or the volumes of the droplets become ununiform. In a worst case, even the discharge of the ink from the ejection outlet can fail.

JP-A 242672/1989 and JP-A 51570/1990 disclose a normally solid ink containing a super-cooling agent so as to prevent pile-up of the ink on a recording medium.

Such a conventional normally solid ink containing a super-cooling agent may prevent pile-up of the ink but requires a considerable time until complete fixation, so that a recorded image is liable to soil hands or be disordered unless a sufficient time is taken after formation of the recorded image.

In addition to the normally solid inks used in the jet recording method, JP-A 236287/1989, JP-A 263170/1989 and JP-A 263171/1989 disclose inks containing, as principal constituents, xylenol, diacetamide and 2,2-dimethyl-1-propanol, respectively. These solid inks, however, are liable to cause a change in ink property or plugging of nozzles on standing without being used for recording, and cause blotting of recorded images depending on the kind of recording paper.

SUMMARY OF THE INVENTION

An object of the present invention is to provide a jet recording method wherein a large bubble is grown in a normally solid recording material to provide a large ejection speed and droplets are reliably ejected with a constant volume.

Another object of the present invention is to provide a normally solid recording material which shows a good fixability of recorded images, is capable of providing high-quality recorded images free from pile-up or blotting and is capable of effectively converting a thermal energy to an ejection energy.

A further object of the present invention is to provide a recording apparatus capable of effectively melting a normally solid recording material and ejecting droplets of the melted material.

According to the present invention, there is provided a jet recording method, comprising:

placing a normally solid recording material in a heat-melted state in a path defined by a nozzle leading to an ejection outlet, and imparting the melted recording material a thermal energy corresponding to a recording signal to generate a bubble, thus ejecting a droplet of the recording material out of the ejection outlet under action of the bubble;

wherein the bubble is caused to communicate with ambience.

According to another aspect of the present invention, there is provided a jet recording method, comprising:

providing a normally solid recording material containing a heat-fusible solid substance having a melting point Tm of 40°–150° C. and a boiling point Tb of 260°–340° C., placing the normally solid recording material in a heat-melted state in a path defined by a nozzle leading to an ejection outlet, and imparting the melted recording material a thermal energy corresponding to a recording signal to generate a bubble, thus ejecting a droplet of the recording material out of the ejection outlet under action of the bubble.

According to a further aspect of the present invention, there is provided a normally solid recording material for use in a jet recording method wherein a normally solid recording material melted in a path defined by a nozzle leading to an ejection outlet is imparted with a thermal energy to be ejected out of the ejection outlet;

said normally solid recording material containing a colorant and a heat-fusible solid substance having a melting point Tm of 40°–150° C. and a boiling point Tb of 260°–340° C.

According to a still further aspect of the present invention, there is provided a normally solid recording material for use in a jet recording method wherein a normally solid recording material melted in a path defined by a nozzle leading to an ejection outlet is imparted with a thermal energy to generate a bubble therein and a droplet of the recording material is ejected under the action of the bubble while the bubble is caused to communicate with ambience;

said normally solid recording material containing a colorant and a heat-fusible solid substance having a melting point Tm and a solidifying point Tf satisfying a relationship of $Tm - Tf \leq 30°$ C.

According to a yet further aspect of the present invention, there is provided a normally solid recording material for use in a jet recording method wherein a normally solid recording material melted in a path defined by a nozzle leading to an ejection outlet is imparted with a thermal energy to generate a bubble therein and a droplet of the recording material is ejected under the action of the bubble while the bubble is caused to communicate with ambience;

said normally solid recording material comprising:

a colorant, a first heat-fusible solid substance having a melting point Tm of 36°–150° C. and a boiling point Tb of 150°–370° C., and a second heat-fusible solid substance having a melting point Tm and a solidifying point Tf satisfying a relationship of $Tm - Tf \leq 30°$ C.

According to still another aspect of the present invention, there is provided a jet recording apparatus, comprising:

a tank for storing a normally solid recording material, a recording head comprising a nozzle defining a path for the recording material in a heat-melted state supplied from the tank and leading to an ejection outlet, and a heater disposed along the path for imparting the recording material a thermal energy corresponding to a recording signal to generate a bubble in the recording material, thus ejecting a droplet of the recording material out of the ejection outlet under action of the bubble; and a heating means for keeping the recording material in the tank and the recording head in a heat-melted state;

wherein said heater is disposed along the path close enough to allow the bubble generated in the recording material to communicate with the ambience.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 2A and 2B are a schematic partial perspective view and a schematic plan view of a recording head used in the recording apparatus shown in FIG. 1.

FIG. 4 is a graph showing an example of changes in internal pressure and volume of a bubble in the case of non-communication of the bubble with the ambience (atmosphere).

FIG. 5 is a graph showing an example of changes in internal pressure and volume of a bubble in the case of communication of the bubble with the ambience.

FIG. 6 is a graph showing an example of changes in internal pressure, volume and further volume-changing rate of a bubble in the case of communication of the bubble with the ambience.

FIG. 7 is a perspective illustration of an example of a system for measuring the volume of a recording method droplet protruded from an ejection outlet.

FIGS. 8(a)–8(c) respectively show a top plan view (a) and a side view (b) of a droplet, and a graph (c) showing the results given by the measurement using the system shown in FIG. 7.

FIG. 10 is a schematic illustration of an embodiment of a recording apparatus designed so that a bubble-forming state and an ejected state of a recording material can be observed.

FIGS. 11–13 are plan views each showing an example of a bubble forming state observed by using the apparatus shown in FIG. 10.

FIG. 14 is a graph showing an example of measurement of a melting point and a solidification point of a normally solid recording material.

FIGS. 23A-23C are sectional views for illustrating another known recording method.

FIGS. 24A and 24B are sectional views for illustrating another known recording method.

DETAILED DESCRIPTION OF THE INVENTION the recording method according to the present invention, a normally solid recording material (ink, i.e., a recording material which is solid at room temperature (5° C.–35° C.)) is melted under heating, and the melted recording material is supplied with a heat energy corresponding to given recording data to be ejected through an ejection outlet (orifice) for recording.

When the recording material in a melted state is imparted with a heat energy corresponding to a recording signal, a bubble is created in the recording material and the created bubble generates an ejection energy for ejecting the recording material through an ejection outlet.

Figure 1:
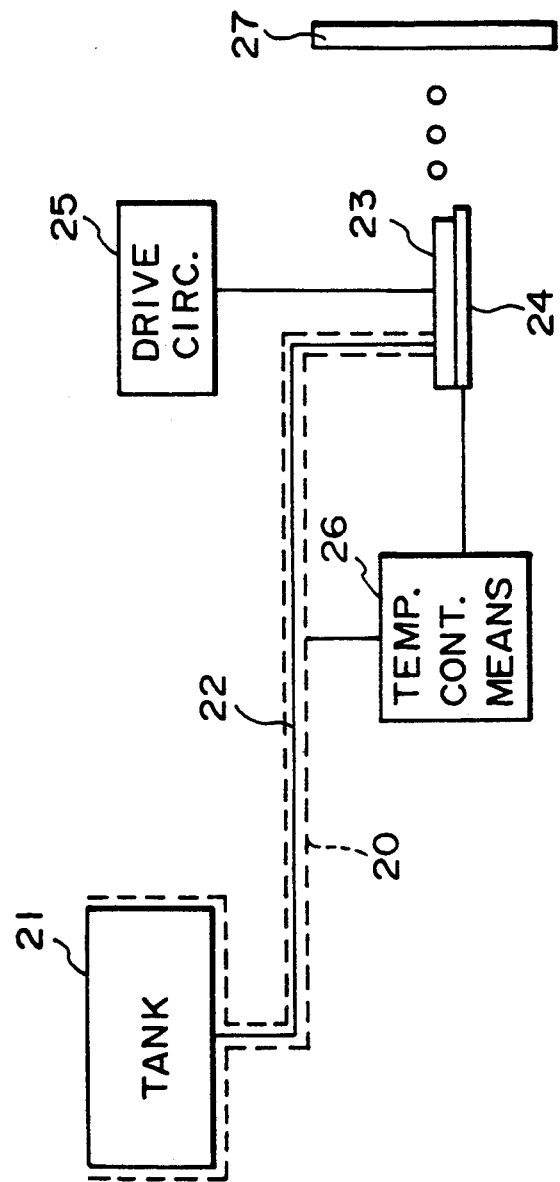
FIG. 1 is a schematic illustration of an embodiment of a recording apparatus for use in a recording method according to the invention.

FIG. 1 illustrates an apparatus (which will be described in further detail hereinafter) for practicing the recording method according to the present invention, wherein a recording material contained in a tank 21 is supplied through a passage 22 to a recording head 23. The recording head 23 may for example be one illustrated in FIGS. 2A and 2B. The tank 21, passage 22 and recording head 23 are supplied with heat by heating means 20 and 24 to keep the recording material in a liquid state in the apparatus. The heating means 20 and 24 are set to a prescribed temperature, which may suitably be higher by 10°–20° C. than the melting point of the recording material, by a temperature control means 26. The recording head 23 is supplied with a recording signal from a drive circuit 25 to drive an ejection energy-generating means (e.g., a heater) in the recording head corresponding to the recording signal.

As shown in FIGS. 2A and 2B, the head 23 is provided with a plurality of walls 8 disposed in parallel with each other on a substrate 1 and a wall 14 defining a liquid chamber 10. On the walls 8 and 14, a ceiling plate 4 is disposed. In FIG. 2A, the ceiling plate 4 is shown apart from the walls 8 and 14 for convenience of showing an inside structure of the recording head. The ceiling plate 4 is equipped with an ink supply port 11, through which a melted recording material is supplied into the liquid chamber 10. Between each pair of adjacent walls 8, a nozzle 15 is formed for passing the melted recording material. At an intermediate part of each nozzle 15 on the substrate 1, a heater 2 is disposed for supplying a thermal energy corresponding to a recording signal to the recording material. A bubble is created in the recording material by the thermal energy from the heater 2 to eject the recording material through the ejection outlet 5 of the nozzle 15.

In the recording method according to the present invention, when a bubble is created and expanded by the supply of thermal energy to reach a prescribed volume, the bubble thrusts out of the ejection outlet 5 to communicate with the ambience (atmosphere). This point is explained further hereinbelow.

Figure 3A:
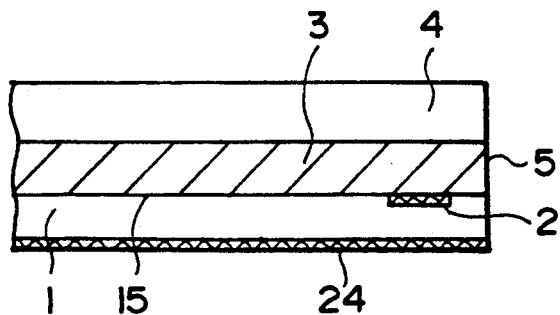
FIGS. 3A–3D are schematic sectional views of a recording head supplying a recording material for illustration of a principle of the recording method according to the invention.
Figure 3B:
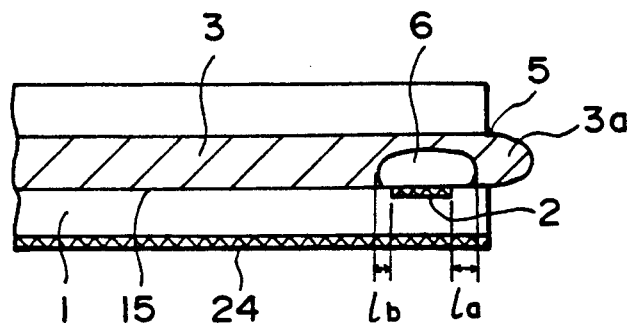
Figure 3C:
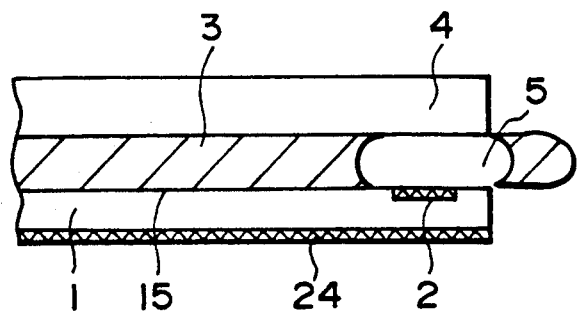
Figure 3D:
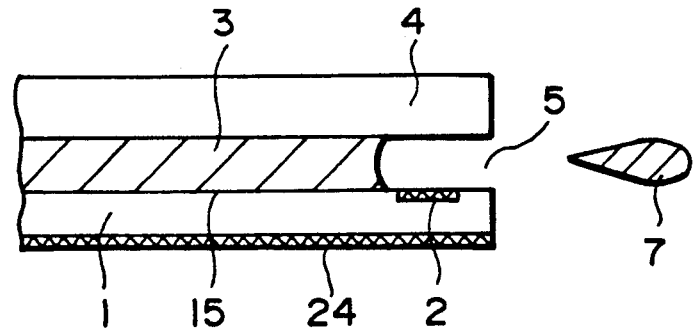

FIGS. 3A-3D show sections of a nozzle 15 formed in the recording head 23, including FIG. 3A showing a state before bubble creation. First, current is supplied to a heating means 24 to keep a normally solid recording material 3 in a melted state. Then, the heater 2 is supplied with a pulse current to instantaneously heat the recording material 3 in the vicinity of the heater 2, whereby the recording material 3 causes abrupt boiling to vigorously generate a bubble 6, which further begins to expand (FIG. 3B). The bubble further continually expands and grows particularly toward the ejection outlet 5 providing a smaller inertance until it thrusts out of the ejection outlet 5 to communicate with the ambience (FIG. 3C). A portion of the recording material 3 which has been closer to the ambience than the bubble 6 is ejected forward due to kinetic momentum which has been imparted thereto by the bubble 6 up to the moment and soon forms a droplet to be deposited onto a recording medium, such as paper (not shown) (FIG. 3D). A cavity left at the tip of the nozzle 15 after the ejection of the recording material 3 is filled with a fresh portion of the recording material owing to the surface tension of the succeeding portion of the recording material and the wetness of the nozzle wall to restore the state before the ejection.

In the recording head 23, the heater 2 is disposed closer to the ejection outlet 5 than in the conventional recording head. This is the simplest structure adoptable for communication of a bubble with the ambience. The communication of a bubble with the ambience is further accomplished by desirably selecting factors, such as the thermal energy generated by the heater 2, the ink properties and various sizes of the recording head (distance between the ejection outlet and the heater 2, the widths and heights of the outlet 5 and the nozzle 15). The required closeness of the heater 2 to the ejection outlet 5 cannot be simply determined but, as a measure, the distance from the front end of the heater 2 to the ejection outlet (or from the surface of the heater 2 to the ejection outlet 5 in the cases of a recording head as shown in FIGS. 9A-9D) may preferably be 5-80 microns, further preferably 10-60 microns.

In order to ensure the communication of a bubble with the ambience, the nozzle 15 may preferably have a height H which is equal to or smaller than a width W thereof, respectively at the part provided with the heater 2 (FIG. 2A). In order to ensure the bubble communication with the ambience, the heater 2 may preferably have a height H which is 50-95%, particularly 70-90%, of the width W of the nozzle. Further, it is preferred that the recording material is melted under heating by the heating means 24 to have a viscosity of at most 100 cps.

It is further preferred to design so that a bubble communicates with the ambience when the bubble reaches 70% or more, further preferably 80% or more, of a maximum volume which would be reached when the bubble does not communicate with the ambience.

Because the bubble created in the recording material communicates with the ambience in the present invention, substantially all the portion of the recording material present between the bubble and the ejection outlet is ejected, so that the volume of an ejected droplet is always constant. In the conventional jet recording method, a bubble created in the recording material does not ordinarily communicate with the ambience but shrinks to disappear after reaching its maximum volume. In the conventional case where a bubble created in the recording material does not communicate with the ambience, not all but only a part of the portion of recording material present between the bubble and the ejection outlet is ejected.

In the jet recording method wherein a bubble does not communicate with the ambience but shrinks after reaching the maximum, the bubble does not completely disappear by shrinkage but remains on the heater in some cases. If a small bubble remains on the heater, there arises a problem that bubble creation and growth for ejecting a subsequent droplet are not normally accomplished due to the presence of such a small bubble remaining on the heater. In contrast thereto, in the jet recording method according to the present invention wherein a bubble is communicated with the ambience, all the recording material present between the bubble and the ejection outlet is ejected so that such a small bubble is not allowed to remain on the heater.

In the recording method according to the present invention, only a small inertance is present between the heater 2 and the ejection outlet 5 of the recording head 23, so that the kinetic momentum of a created bubble 6 is effectively imparted to a droplet 7. For this reason, even a material having a high viscosity which cannot be easily ejected according to the conventional recording method, such as a liquefied ink formed by heating a normally solid recording material to above its melting point, can be stably ejected. Further, in the recording method according to the present invention, the ejection speed of the recording material becomes very fast because a bubble created in the recording material communicates with the ambience. Accordingly, a droplet of the recording material is attached accurately to an objective point on the recording medium, and even a normally solid recording material can be attached to the recording medium in a small thickness without pile-up. The attachment in a small thickness of the solid recording material on the recording medium is most advantageous in superposing several colors of recording materials on a single recording medium to form a multi-color image.

In the present invention, it is preferred that a bubble created by the heater 2 is caused to communicate with the ambience out of the ejection outlet 5 when the internal pressure of the bubble is not higher than the ambient (atmospheric) pressure.

FIG. 4 is a graph showing a relationship between the internal pressure (curve a) and the volume (curve b), of a bubble in case where the bubble does not communicate with the ambience. Referring to FIG. 4, at time $T=t_0$ when the heater 2 is energized with a pulse current, a bubble is created in the recording material to cause an abrupt increase in bubble internal pressure and the bubble starts to expand simultaneously with the creation.

The bubble expansion does not cease immediately after the termination of current supply to the heater 2 but continues for a while thereafter. As a result, the bubble internal pressure abruptly decreases to reach a pressure below the ambient pressure (0 atm.-gauge) after $T=t_1$. After expansion to some extent, the bubble starts to shrink and disappears.

Accordingly, if the bubble is caused to communicate with the ambience at some time after time $T=t_1$, e.g., time $t_a$, as shown in FIG. 5, the bubble internal pressure immediately before the communication is lower than the ambient pressure.

If the bubble is communicated with the ambience to eject a droplet when the internal pressure thereof is below the ambient pressure, the formation of splash or mist of the recording material unnecessary for recording can be prevented, so that the soiling of the recording medium or the apparatus is avoided.

Hitherto, in the conventional jet recording method, there has been encountered a problem that splash or mist of the recording material is ejected in addition to a droplet effective for recording. The occurrence of such splash or mist can be prevented by lowering the bubble internal pressure to a value not higher than the ambient pressure when the bubble is communicated with the ambience in the present invention.

It is difficult to directly measure the bubble internal pressure, but the satisfaction of the condition of the bubble internal pressure being smaller than the ambient pressure may be suitably judged in the following manner.

The volume $V_b$ of the bubble is measured from the start of the bubble creation to the communication thereof with the ambience. Then, the second order differential $d^2V_b/dt^2$ is calculated, based on which the relative magnitudes of the internal pressure and the atmospheric pressure may be judged. If $d^2V_b/dt^2 > 0$, the internal pressure is higher than the ambient pressure. If $d^2V_b/dt^2 < 0$, the internal pressure is not higher than the ambient pressure. Referring to FIG. 6, during a period of from the state of bubble creation at time $T=t_0$ to time $T=t_1$, the bubble internal pressure is higher than the ambient pressure ($d^2V_b/dt^2 > 0$), and during a period from time $T=t_1$ to the bubble communication with the ambience at time $T=t_a$, the bubble internal pressure is lower than the ambient pressure. As described above, by calculating $d^2V_b/dt^2$, i.e., the second order differential of $V_b$, it is possible to know the relationship regarding magnitude between the bubble internal pressure and the ambient pressure.

Instead of measuring the above-mentioned bubble volume $V_b$, it is also possible to judge the relative magnitudes of the bubble internal pressure and the ambient pressure by measuring the volume $V_d$ of a protrusion $3a$ (FIG. 3B) of the recording material out of the ejection outlet 5 (hereinafter called "ink protrusion $3a$") in a period from the start of the bubble creation to the ejection of a droplet of the recording material (a period between the states shown in FIGS. 3a and 3C) and calculating the second order differential of $V_d$, i.e., $d^2V_d/dt^2$. More specifically, if $d^2V_d/dt^2 > 0$, the bubble internal pressure is higher than the ambient pressure, and if $d^2V_d/dt^2 < 0$, the bubble internal pressure is not higher than the ambient pressure.

The volume Vd of the ink protrusion 3a at various points of time may be measured by observation through a microscope of the ink protrusion 3a while it is illuminated with pulse light from a light source such as a stroboscope, LED or laser. The pulse light is emitted to the recording head driven at regular intervals for continuously ejecting droplets with synchronization with drive pulses for the recording head and with a predetermined delay, whereby the projective configuration of the ink protrusion 3a as seen in one direction at prescribed points of time. The pulse width of the pulse light is preferably as small as possible, provided that the quantity of the light is sufficient for the observation, so as to allow an accurate determination of the configuration. It is possible to roughly calculate the volume of the ink protrusion 3a by measurement in only one direction. For a more accurate determination, however, it is preferred to measure the configurations of the ink protrusion 3a simultaneously in two directions y and z which are perpendicular to each other and are respectively perpendicular to direction x in which droplets are ejected, as shown in FIG. 7. It is desirable that either one of the directions y and z for observation by microscopes 201 is disposed parallel to the direction of arrangement of the ejection outlets 5.

Referring to FIG. 8, based on the observed images in the two directions y and z as shown at (a) and (b), the widths a(x) and b(x) along the x-axis of the ink protrusion 3a are measured. Using the measured widths a(x) and b(x) as functions of x as shown at (c), the volume Vd of the ink projection at a predetermined delay period can be calculated from the following equation:

$$Vd = (\pi/4) \int a(x) \cdot b(x) dx.$$

The above equation is based on approximation of the y-x cross-section of the ink projection 3a as an oval shape and is usable for calculation of volume of the ink projection 3a or bubble 6 at a sufficiently high accuracy.

Further, by gradually changing the delay period of the pulse light from the light source 200 from zero for a plurality of ink projections, the change in volume Vd with time of an ink projection from the creation of a bubble to the ejection of a corresponding droplet can be approximately obtained.

The volume Vb of a bubble in the nozzle 15 can be also measured by application of the method illustrated in FIG. 7. In this case for measurement of the bubble volume Vb, however, it is necessary to form a part of the recording head with a transparent member so that the bubble can be observed from outside the recording head.

In order to determine the behavior of the ink projection 3a and the bubble, a time resolution power of about 0.1 micro-sec is required, so that the pulse light source may preferably comprise an infrared LED and have a pulse width of about 50 n.sec., and the microscope 201 may preferably be connected to an infrared camera so as to photograph the image.

Further, if the bubble is communicated with the ambience when the first order differential of the moving speed of the bubble front in the ejection direction is negative, the occurrence of mist or splash can be further prevented.

Referring to FIG. 3B, if the distance $l_a$ from the ejection outlet 5 side end of the heater 2 as the ejection energy generating means to the front end (ejection outlet 5 side end) of a bubble 6 and the distance $l_b$ from the opposite side end of the heater 2 to the rear end (on the side opposite to the ejection outlet 5) of the bubble are set to satisfy $l_a/l_b \geq 1$, preferably $l_a/l_b \geq 2$, more preferably $l_a/l_b \geq 4$, at an instant immediately before the communication with the ambience, it is possible to shorten the time for filling the cavity formed after ejection of the recording head with a fresh portion of the recording material, thus realizing a further high-speed recording. The ratio $l_a/l_b$ may be increased, e.g., by shortening the distance between the heater 2 and the ejection outlet 5.

Figure 9A:
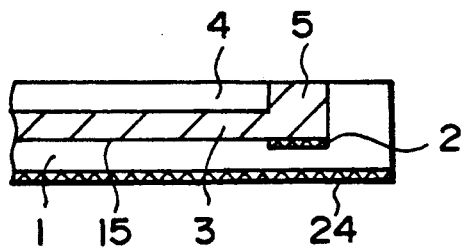
FIGS. 9A–9D are schematic sectional views of another example of a recording head supplying a recording material for illustration of a principle of the recording method according to the invention.
Figure 9B:
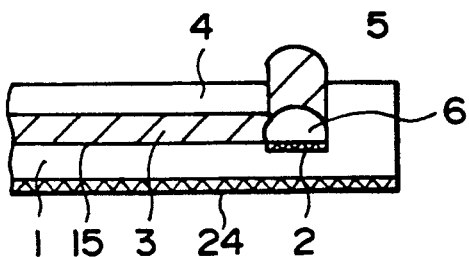
Figure 9C:
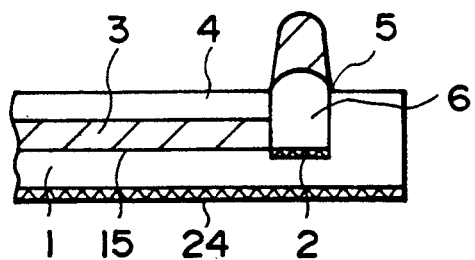
Figure 9D:
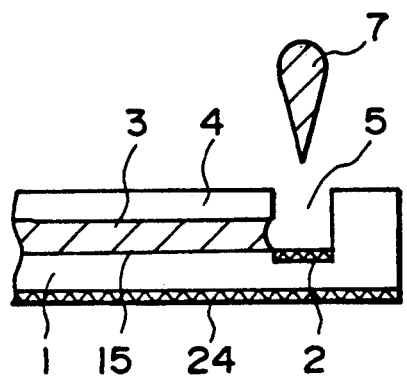

FIGS. 9A-9D illustrate another embodiment of the recording head used in the present invention which includes an ejection outlet 5 disposed on a lateral side of a nozzle 15. Also in the case of using the recording head shown in FIGS. 9A-9D, a bubble 6 is caused to communicate with the ambience similarly as in the case of using the head shown in FIGS. 3A-3D. More specifically, from a state of before bubble generation in FIG. 9A, a recording material 3 melted under operation of a heating means 24 is heated by energizing a heater 2 to create a bubble 6 on the heater 2 (FIG. 9B). The bubble 6 continues to expand (FIG. 9C) until it communicates with the ambience to eject a droplet 7 out of the ejection outlet 5 (FIG. 9D).

Next, an explanation is made to the recording material (ink) which is normally solid, i.e., solid at room temperature (5° C.-35° C.) in a sense used herein.

As described above in the present invention, a normally solid recording material is heat-melted and the heat-melted recording material is imparted with a thermal energy corresponding to a recording signal to be discharged out of an ejection outlet for recording. Accordingly, the normally solid recording material used in the present invention comprises at least a heat-fusible solid substance and a colorant, and optionally additives for adjusting ink properties and a normally liquid organic solvent, such as an alcohol.

The recording material according to the present invention may preferably have a melting point in the range of 36° C. to 200° C. Below 36° C., the recording material is liable to be melted or softened according to a change in room temperature to soil hands. Above 200° C., a large quantity of energy is required for liquefying the recording material. More preferably, the melting point is in the range of 36° C.-150° C.

The heat-fusible substance contained in the normally solid recording material according to the present invention may, for example, include: acetamide, p-vaniline, o-vaniline, dibenzyl, m-acetotoluidine, phenyl benzoate, 2,6-dimethylquinoline, 2,6-dimethoxyphenol, p-methylbenzyl alcohol, p-bromoacetophenone, homo-catechol, 2,3-dimethoxybenzaldehyde, 2,4-dichloroaniline, dichloroxylylene, 3,4-dichloroaniline, 4-chloro-m-cresol, p-bromophenol, dimethyl oxalate, 1-naphthol, dibutylhydroxytoluene, 1,3,5-trichlorobenzene, p-tertpentylphenol, durene, dimethyl-p-phenylenediamine, tolan, styrene glycol, propionamide, diphenyl carbonate, 2-chloronaphthalene, acenaphthene, 2-bromonaphthalene, indole, 2-acetylpyrrole, dibenzofuran, p-chlorobenzyl alcohol, 2-methoxynaphthalene, tiglic acid, p-dibromobenzene, 9-heptadecanone, 1-tetradecanamine, 1,8-octanediamine, glutaric acid, 2,3-dimethylnaphthalene, imidazole, 2-methyl-8-hydroxyquinoline, 2-methylindole, 4-methylbiphenyl, 3,6-dimethyl-4-octyne-diol, 2,5-dimethyl-3-hexyne-2,5-diol, 2,5-dimethyl-2,5-hexanediol, ethylene carbonate, 1,8-octane diol, 1,1-diethylurea, butyl p-hydroxybenzoate, methyl 2-hydroxynaphthoate, 8-quinolinol, stearylamine acetate, 1,3-diphenyl-1,3-propanedione, methyl m-nitrobenzoate, dimethyl oxalate, phthalide, 2,2-diethyl-1,3-propanediol, N-tert-butylethanolamine, glycolic acid, diacetylmonooxime, and acetoxime. These heat-fusible substances may be used singly or in mixture of two or more species.

The above-mentioned heat-fusible substances include those having various characteristics, such as substances having particularly excellent dischargeability, substances having particularly excellent storability and substances providing little blotting on a recording medium. Accordingly, these heat-fusible substances can be selected depending on desired characteristics.

A heat-fusible substance having a melting point Tm and a boiling point Tb (at 1 atm. herein) satisfying the following formulae (A) and (B) may preferably be used so as to provide a normally solid recording material which is excellent in fixability of recorded images and can effectively convert a supplied thermal energy to a discharge energy.

$$36° C. \leq Tm \leq 150° C. \quad (A)$$

$$150° C. \leq Tb \leq 370° C. \quad (B)$$

The boiling point Tb may preferably satisfy $200° C. \leq Tb \leq 340° C.$

Further, a recording material containing a heat-fusible substance having Tm and Tb satisfying $40° C. \leq Tm \leq 150° C.$ and $260° C. \leq Tb \leq 340° C.$ can very effectively convert a supplied thermal energy to a discharge energy, so that it can be effectively used not only in the jet recording method explained with reference to FIGS. 3A–3D and FIGS. 9A–9D but also in a recording method wherein a generated bubble does not communicate with the ambience, i.e., a recording method wherein a bubble generated in the recording material continually expands to discharge an ink droplet and then, after reaching its maximum volume, shrinks to disappear, because it provides, a large discharge rate of a droplet and can surely discharge a droplet without clogging a nozzle.

Hereinbelow, some explanation is added regarding the discharge or ejection characteristic of the recording material.

When a normally solid recording material in its molten state is imparted with a thermal energy corresponding to a recording signal, a bubble is created in the recording material to generate a discharge energy for ejecting the recording material out of the ejection outlet. The discharge energy can change variously depending on bubble creation states. This has been confirmed by our observation using an apparatus as illustrated in FIG. 10 for evaluation of the discharge characteristic of a recording material, which has been constructed so as to allow observation of a bubble formation state in the recording material. A correlation between the bubble formation state and the discharge state (better or worse ejection state) of the recording material was examined by using the apparatus.

Figure 20:
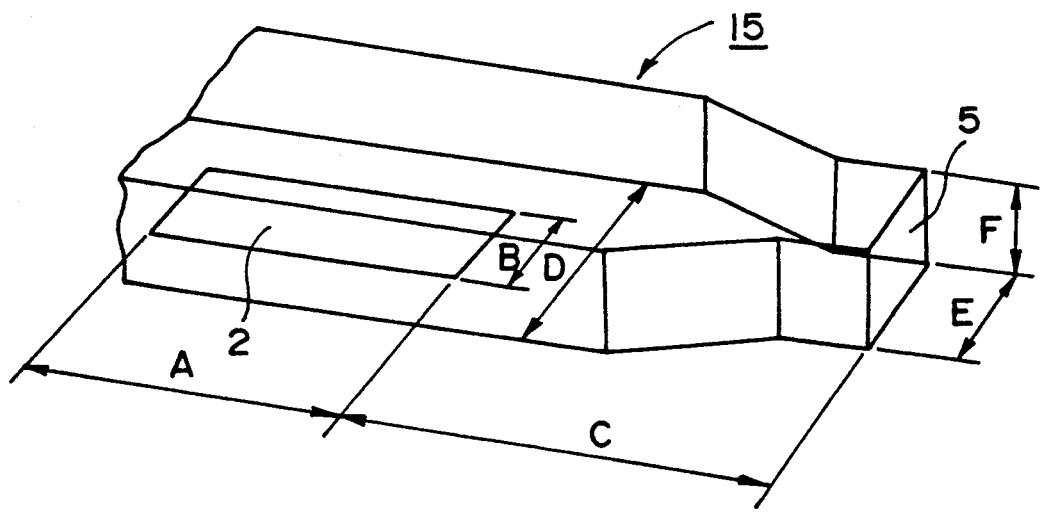
FIG. 20 is a perspective view showing an example of a nozzle shape in a recording head for performing the recording method according to the invention.

A recording head 123 was one for a commercially available bubble jet printer ("BJ130J", mfd. by Canon K.K.). The recording head 123 was similar to one shown in FIGS. 2A and 2B but had heater 2 disposed more remote from the ejection outlet 5 so that the recording material was discharged without causing a bubble created in the recording material to communicate with the ambience. More specifically, the recording head (for "BJ130J") had 48 nozzles at a density of 360 nozzles/inch and each nozzle had an ejection outlet 5 which was narrower than a liquid path leading thereto as shown in FIG. 20, including dimensions of A (heater 2 length)=135 microns, B (heater width)=27 microns, C=120 microns, D=50 microns, E=30 microns and F=30.5 microns.

Above the recording head 123 was disposed a microscope 16 so as to be able to observe the inside of the nozzle 15 of the recording head 123 through a transparent ceiling plate as shown in FIG. 10. A strobo 17 was attached to the microscope 16 so as to be able to observe the bubble forming state in the recording material only when the strobo 17 flashed. The strobo 17 was disposed so that it flashed after lapse of an arbitrarily settable delay time from the commencement of heat application from the heater 2 by means of a strobo drive circuit 18 and a delay circuit 19.

The recording head 123 was equipped with a heating means 24 connected to an external power supply 29 so as to heat the recording head 123 to a temperature higher than the melting point of the recording material by 10°–20° C. to keep the recording material in a molten state. The head 123 was driven by a head drive circuit 28.

Thus, a recording material in a molten state filling a liquid chamber 10 in the recording head 123 supplied to the nozzle 15 was heated by the heater 2 supplied with a pulse current, and bubbles generated on the heater 2 were observed at varying delay times for strobo flashing. Incidentally, in the observation of the discharge characteristic, a recording material containing no or only a slight amount of colorant was used. This is because a bubble cannot be easily observed in a recording material containing much colorant. The heater 2 in the apparatus shown in FIG. 10 was energized under the condition of a pulse width of 7 micro-seconds, an applied voltage of 25–30 volts, and a drive frequency of 100 Hz.

As a result of examination of the discharge or ejection characteristic for heaters 2 having a width of 10–150 microns and a length of 10–200 microns, it was discovered that a good discharge characteristic of the recording material was attained when a single bubble 80 at its maximum volume covered at least ½, further preferably at least ¾, of the heater 2 area as shown in FIG. 11. (This state may be referred to as "single (bubble) boiling".) On the other hand, in cases where a single created bubble 81 occupied only a minor proportion of the heater 2 area as shown in FIG. 12 or a plurality of small bubbles occurred on the heater 2 so that no single one of the bubble was large enough to cover at least ½ of the heater 2 area as shown in FIG. 13, the recording material was not satisfactorily ejected out of the ejection outlet because of insufficient discharge energy.

As a result of study on the condition for the single bubble boiling by variously changing the heat-fusible substance, it has been found suitable to use a heat-fusible substance having a boiling point of 150°–370° C., preferably 200°–340° C., further preferably 200° C.–340° C., particularly preferably 260° C.–340° C. It has been also found that a recording material containing a heat-fusible substance having a boiling point of 150°–370° C., particularly 260° C.–340° C., causes little evaporation of the recording material from the recording head leading to a change in physical property of the recording material or nozzle clogging.

The recording material used in the present invention is solid at room temperature (5° C.–35° C.) so that it provides a good fixability of recorded images and high-quality recorded images even on plain paper. In order to provide a normally solid recording material, the heat-fusible solid substance used in the present invention may suitably have a melting point of at least 36° C., preferably at least 40° C., further preferably at least 50° C. In view of the amount of thermal energy required for melting the recording material, the heat-fusible solid substance may suitably have a melting point of at most 150° C., preferably at most 120° C.

Preferred examples of the heat-fusible solid substance having a melting point of 40°–150° C. and a boiling point of 260°–340° C. may include: acenaphthene, 2-bromonaphthalene, 2,6-dimethylquinoline, vaniline, dibutylhydroxytoluene, diphenyl carbonate, m-acetotoluidine, phenyl benzoate, and 1-naphthol. A recording material containing such a heat-fusible solid substance having a specific melting point and a specific boiling point may ensure satisfactory ejection of a droplet not only in a jet recording method explained with reference to FIGS. 3 and 9 but also in a jet recording method wherein a bubble generated does not communicate with the ambience.

Among the heat-fusible solid substances, those having a boiling point Tm and a solidifying point Tf satisfying a relation of $Tm - Tf \leq 30°$ C. .... (C) may suitably be used so as to provide a normally solid recording material which provides recorded images excellent in fixability and free from blurring or feathering. It is particularly preferred to use a heat-fusible solid substance satisfying $Tm - Tf \leq 15°$ C.

When a heat-fusible solid substance having a relation of $Tm - Tf > 30°$ C. is used, the resultant recording material is liable to excessively penetrate into a recording medium before solidification thereof while it depends on the kind of the recording medium, to result in recorded images with feathering or blotting.

It is further preferred to use a heat-fusible solid substance satisfying $Tm - Tf \geq 7°$ C. so as to suppress pile-up of the recording material on the recording medium surface.

The solidifying point Tf may suitably be 36°–150° C., preferably 40°–150° C.

The melting points Tm and solidifying points Tf referred to herein are based on values measured by using a differential scanning calorimeter ("DSC-7", mfd. by Perkin Elmer Co.) at a temperature-increasing rate of 5° C./min. and a temperature-decreasing rate of 5° C./min, respectively, whereby the melting points Tm are measured as temperatures giving a heat absorption peak on the DSC curve on heating and the solidifying points are measured as temperatures giving a heat emission peak on the DSC curve on cooling.

FIG. 14 shows an example of measurement of the melting point Tm and solidifying point Tf of a recording material according to the present invention having the following composition:

| | |
|---|---|
| Dibenzofuran | 9.5 parts |
| Valifast Black #3820 | 0.5 part |

Referring to FIG. 14, the point A indicates a melting point Tm, and the point B indicates a solidifying point Tf. Incidentally, it has been confirmed experimentally, that addition of a small amount of colorant does not substantially change the melting, solidifying and boiling characteristics of a heat-fusible solid substance to which the colorant is added.

Preferred examples of the heat-fusible solid substance satisfying $Tm - Tf \leq 30°$ C. may include: 1,8-octanediol, 2,5-dimethyl-2,5-hexanediol, imidazole, 4-methylbiphenyl, 9-heptadecanone, indole, 2-acetylpyrrole, dibenzofuran, 2-methoxynaphthalene, tiglic acid, p-dibromobenzene, styrene glycol, 1,1-diethylurea, butyl p-hydroxybenzoate, methyl 2-hydroxynaphthoate, 8-quinolynol, stearylamine acetate, 1,3-diphenyl-1,3-propanedione, methyl m-nitrobenzoate, dimethyl oxalate, and glutaric acid.

The recording material according to the present invention can optionally contain a normally liquid organic solvent, examples of which may include: alcohols, such as 1-hexanol, 1-heptanol and 1-octanol; alkylene glycols, such as ethylene glycol, propylene glycol and triethylene glycol; ketones, ketoalcohols, amides, and ethers. Such an organic solvent has a function of enlarging the size of a bubble generated in the recording material. Such an organic solvent may preferably have a boiling point of at least 150° C.

As described above, the heat-fusible solid substance used in the present invention should preferably satisfy all of the above-mentioned formulae (A), (B) and (C). However, only limited substances can singly satisfy all the requirements (A)–(C). For this reason, in order to use a broader scope of substances, it is suitable to constitute the heat-fusible solid substance in the recording material according to the present invention by combining a first heat-fusible solid substance satisfying the formulae (A) and (B) and a second heat-fusible solid substance satisfying the formula (C).

Examples of the first heat-fusible solid substance satisfying the requirements (A) and (B) in combination may include: acetamide, vaniline, dibenzyl, m-acetotoluidine, phenyl benzoate, 2,6-dimethylquinoline, 2,6-dimethoxyphenol, p-methylbenzyl alcohol, p-bromoacetophenone, homo-catechol, 2,3-dimethoxybenzaldehyde, 2,4-dichloroaniline, dichloroxylylene, 3,4-dichloroaniline, 4-chloro-m-cresol, p-bromophenol, dimethyl oxalate, 1-naphthol, dibutyhydroxytoluene, 1,3,5-trichlorobenzene, p-tertpentylphenol, durene, dimethyl-p-phenylenediamine, tolan, styrene glycol, propionamide, diphenyl carbonate, 2-chloronaphthalene, acenaphthene, 2-bromonaphthalene, indole, 2-acetylpyrrole, dibenzofuran, p-chlorobenzyl alcohol, 2-methoxynaphthalene, tiglic acid, p-dibromobenzene, 9-heptadecanone, 1-tetradecanamine, 1,8-octanediamine, glutaric acid, 2,3-dimethylnaphthalene, imidazole, 2-methyl-8-hydroxyquinoline, 2-methylindole, 4-methylbiphenyl, 3,6-dimethyl-4-octyne-diol, 2,5-dimethyl-3-hexyne-2,5-diol, 2,5-dimethyl-2,5-hexanediol, and ethylene carbonate.

Examples of the second heat-fusible solid substance satisfying the requirement (C) may include: 1,8-octanediol, 2,5-dimethyl-2,5-hexanediol, imidazole, 4-methylbiphenyl, 9-heptadecanone, indole, 2-acetylpyrrole, dibenzofuran, 2-methoxynaphthalene, tiglic acid, p-dibromobenzene, styrene glycol, 1,1-diethylurea, butyl p-hydroxybenzoate, methyl 2-hydroxynaphthoate, 8-quinolynol, stearylamine acetate, 1,3-diphenyl-1,3-propanedione, methyl m-nitrobenzoate, dimethyl oxalate, and glutaric acid; and further, waxes, such as carnauba wax, paraffin wax, sasol wax, microcrystalline wax, and ester wax; aliphatic acids, such as stearic acid and palmitic acid; higher alcohols, such as cetyl alcohol and stearyl alcohol; diols, such as hexanediol, octanediol, decanediol and dodecanediol; aliphatic acid esters, aromatic compounds such as aromatic esters and aromatic alcohols, polyamide resins, polyester resins, polyurethane resins, epoxy resins, polyolefin resins and acrylic resins.

A particularly preferred first heat-fusible solid substance is ethylene carbonate, with which it is preferred to use a second heat-fusible solid substance having 2-8, particularly 2-5, hydroxyl groups, such as polyhydric alcohols and partially esterified products thereof, saccharides and partially esterified products thereof. The second heat-fusible solid substance used in combination with ethylene carbonate as a first heat-fusible solid substance may preferably have a hydroxyl value of 300–1000, particularly 330–960, and have a melting point of 50°–120° C., particularly 60°–110° C. Preferred examples of the second heat-fusible solid substance suitably used in combination with ethylene carbonate as a first heat-fusible solid substance may include: 1,12-dodecanediol, 1,10-decanediol, 1,8-octanediol, glycerin mono-12-hydroxystearate, and methyl 9,10-dihydroxystearate.

It is also possible to add a compatibility improver such as a surfactant, in order to improve the compatibility between the first and second heat-fusible solid substances.

It is preferred that at least one of the first and second heat-fusible solid substances satisfies $Tm - Tf \geq 7°$ C. so as to suppress the pile-up of the recording material on the recording medium surface.

It is further preferred that the first heat-fusible solid substance satisfies the preferred ranges of Tm and Tb referred to in the previous description regarding the formulae (A) and (B). It is also preferred that the second heat-fusible solid substance satisfies the preferred conditions regarding Tm and Tf referred to in the previous description regarding the formula (C).

The colorant contained in the recording material used in the present invention may include known ones inclusive of various dyes, such as direct dyes, acid dyes, basic dyes disperse dyes, vat dyes, sulfur dyes and oil-soluble dyes, and pigments. A particularly preferred class of dyes may include oil-soluble dyes, including those described below disclosed in the color index:

C.I. Solvent Yellow 1, 2, 3, 4, 6, 7, 8, 10, 12, 13, 14, 16, 18, 19, 21, 25, 25:1, 28, 29, 30, 32, 33, 34, 36, 37, 38, 40, 42, 43, 44, 47, 48, 55, 56 58, 60, 62, 64, 65, etc.;

C.I. Solvent Orange 1, 2, 3, 4, 4:1, 5, 6, 7, 11, 16, 17, 19, 20, 23, 25, 31, 32, 37, 37:1, 38, 40, 40:1, 45, 54, 56, 59, 60, 62, 63, 67, 68, 71, 72, 73, 74, 75; etc.;

C.I. Solvent Red 1, 2, 3, 4, 7, 8, 13, 14, 17, 18, 19, 23, 24, 25, 26, 27, 29, 30, 33, 35, 37, 41, 42, 43, 45, 46, 47, 48, 49, 49:1, 52, 68, 69, 72, 73, 74, 80, 81, etc.;

C.I. Solvent Violet 2, 3, 8, 9, 10, 11, 13, 14, 21, 21:1, 24, 31, 32, 33, 34, 36, 37, 38, 45, 46, 47, etc.;

C.I Solvent Blue 2, 4, 5, 7, 10, 11, 12, 22, 25, 26, 35, 36, 37, 38, 43, 44, 45, 48, 49, 50, 51, 63, 64, 66, 67, 68, 70, etc.;

C.I. Solvent Green 1, 3, 4, 5, 7, 8, 9, 20, 26, 28, 29, 30, 32, 33, etc.;

C.I. Solvent Brown 1, 1:1, 2, 3, 4, 5, 6, 12, 19, 20, 22, 25, ,28, 29, 31, 37, 38, 42, 43 44, 48, 49, 52, 53, 58, etc.; and C.I. Solvent Black 3, 5, 6, 7, 8, 13, 22, 22:1, 23, 26, 27, 28, 29, 33, 34, 35, 39, 40, 41, 42, 43, 45, 46, 47, 48, 49, 50, etc.

It is also preferred to use inorganic pigments, such as calcium carbonate, barium sulfate, zinc oxide, lithopone, titanium oxide, chrome yellow, cadmium yellow, nickel titanium yellow, naples yellow, yellow iron oxide, red iron oxide, cadmium red, cadmium mercury sulfide, Prussian blue, and ultramarine; carbon black; and organic pigments, such as azo pigments, phthalocyanine pigments, triphenylmethane pigments and vat-type pigments. Preferred examples of the suitable pigment may include those described below disclosed in the color index:

C.I. Pigment Yellow 1, 2, 3, 5, 12, 13, 14, 15, 17, 83; C.I. Vat. Yellow 1; C.I. Pigment Orange 1, 5, 13, 16, 17, 24; C.I. Vat Orange 3; C.I. Pigment Red 1, 2, 3, 4, 5, 7, 9, 12, 22, 23, 37, 38, 48, 49, 50, 51, 53, 57, 58, 60, 63, 81, 83, 88, 112; C.I. Pigment Violet 1, 3, 19, 23; C.I. Vat Violet 2; C.I. Pigment Blue 1,2, 15, 16, 17; C.I. Vat Blue 4; C.I. Pigment Green 2, 7, 8, 10; C.I. Pigment Black 1.

The heat-fusible solid substance may preferably be contained in a proportion of 50–99 wt. %, particularly 60–95 wt. %, of the recording material.

In the case where the heat-fusible solid substance comprises a mixture of the first heat-fusible solid substance and the second heat-fusible solid substance described above, it is preferred that the first heat-fusible solid substance is used in an amount constituting 30–90 wt. %, further preferably, 40–70 wt. %, of the total heat-fusible solid substance.

The colorant may preferably be used in a proportion of 1–20 wt. %, particularly 3–15 wt. %, of the recording material.

The optionally added organic solvent may suitably be contained in a proportion of 0–10 wt. % of the recording material.

In addition to the above components, it is also possible to add optional additives, such as antioxidants, dispersants, and anticorrosives as desired into the recording material according to the present invention.

The recording material according to the present invention may be obtained by mixing the above-mentioned components under heating.

Hereinbelow, a recording apparatus suitably usable for practicing the recording method according to the present invention will be explained.

Figure 15:
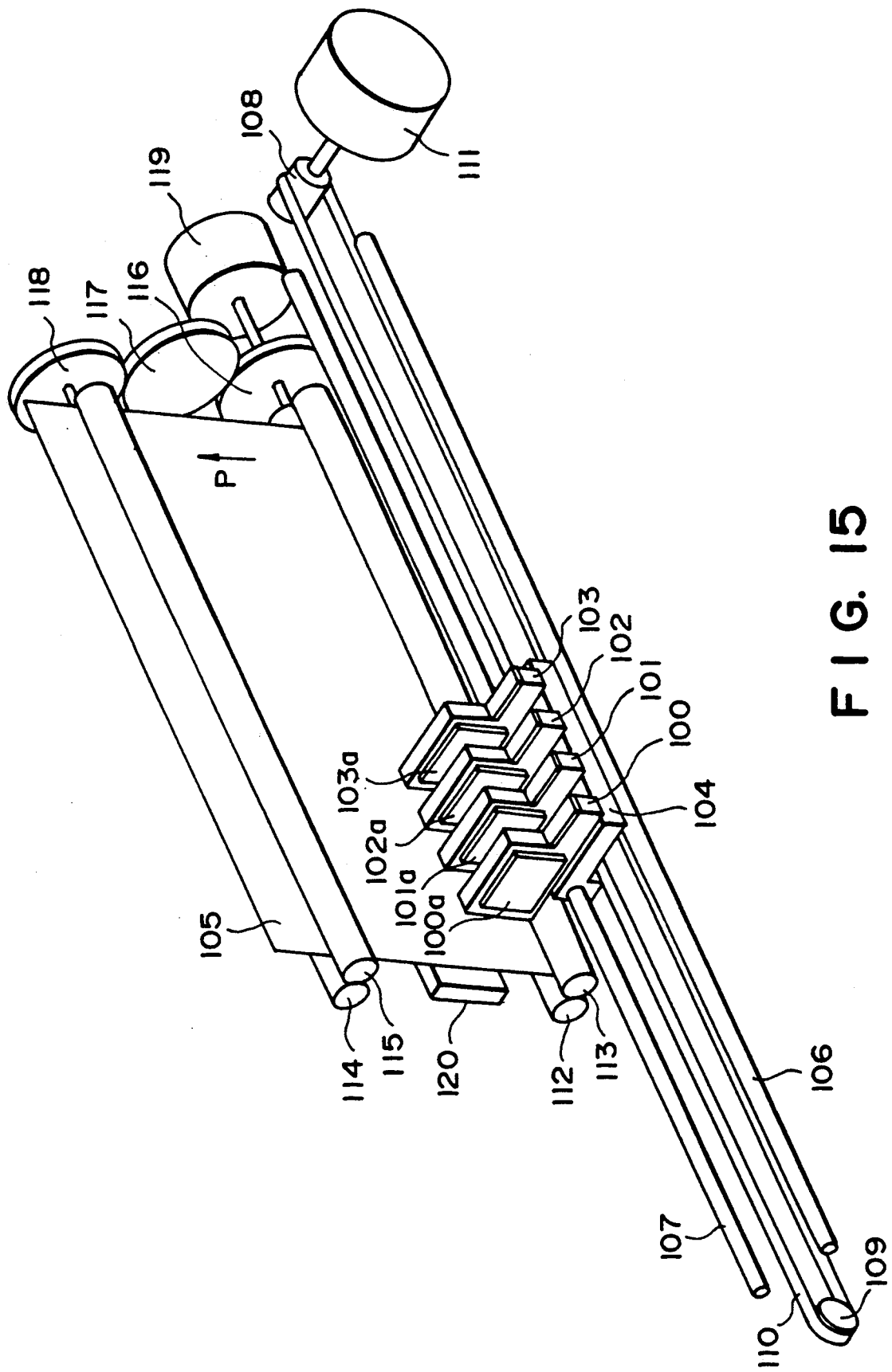
FIG. 15 is a perspective view showing an embodiment of the recording apparatus for performing the recording method according to the invention.

FIG. 15 is a perspective view of an embodiment of the recording apparatus suitably usable for practicing the recording method according to the present invention. The apparatus includes recording heads 100, 101, 102 and 103 each equipped with a tank and having, e.g., 44 nozzles at a pitch of 16 nozzles/mn. Recording is performed by ejecting a normally solid recording material to a recording medium 105 by means of the tank-equipped recording heads 100–103. In the apparatus shown in FIG. 15, the four tank-equipped recording heads 100–103 of the same structure are carried on a carriage 104 for performing multi-color recording. The tank-equipped recording heads 100–103 are used to eject mutually different colors of recording materials, e.g., yellow, magenta, cyan and black, respectively.

Each tank-equipped recording head shown in FIG. 15 integrally includes a tank storing a recording material and a recording head, thus, e.g., an integral combination of a tank 21 and a recording head 23 shown in FIG. 1.

The tank-equipped recording heads 100–103 are provided with temperature-control heaters 100a, 101a, 102a and 103a, respectively, for heating the tank-equipped recording heads to keep the recording materials therein in a molten state. Thus, the heaters 100a–103a correspond to the heating means 20 and 24 in FIG. 1.

The carriage 104 is supported slidably with guide rails 106 and 107. To the carriage 104 is fixed an endless belt 110 which is wound about a motor pulley 108 and a tension pulley 109. The motor pulley 108 is rotatably fixed about a shaft connected to a carriage motor 111, so that the pulley 108 is rotated when the carriage motor 111 is driven depending on a scanning signal. As a result, the endless belt 110 is rotated, and accordingly, the carriage 104 is slided along the guide rails 106 and 107. Thus, the carriage 104 is scanningly moved depending on a scanning signal.

The recording medium (paper) 105 is held by being sandwiched between a paper feed roller 112 and a paper feed pinch roller 113 and between a tension roller 114 and a tension pinch roller 115. To the paper feed roller 112 and the tension roller 114 is transmitted a revolution force exerted by a motor 119 by the medium of gears 116–118. Thus, along with the revolution of the motor 119, the recording medium 105 is sent in the direction of an arrow P.

At a position opposite to the tank-equipped recording head 100–104, a platen 120 is disposed with the recording medium 105 therebetween. The ejection outlets (not shown) of the tank-equipped recording heads are disposed with a spacing of, e.g., 0.5 mm from the recording medium 105.

As the carriage 104 is moved along the guide rails 106 and 107 and the recording medium 105 is sent in the direction P in synchronization with the movement of the carriage 104 in the above-described manner, recording is successively performed on the recording medium.

Figure 16:
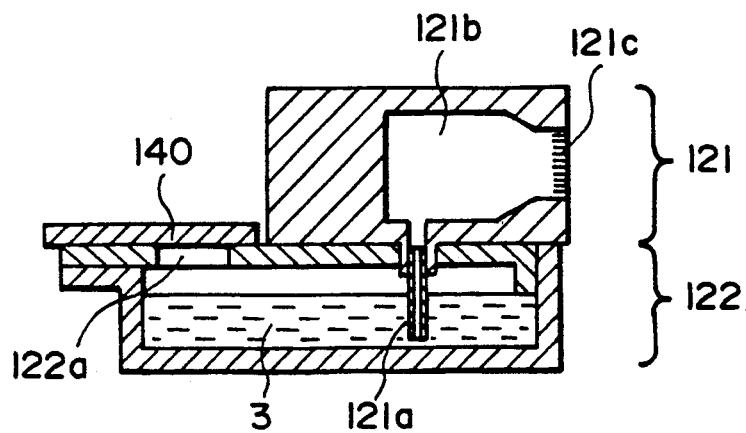
FIGS. 16 and 17 are sectional views each showing a recording head equipped with a tank used for practicing an embodiment of the recording method according to the invention.

Each of the tank-equipped recording heads 100–103 comprises an integral combination of a recording head 121 and a tank 122 containing a recording material 3 in a molten state as shown in FIG. 16. The structure of the recording head 121 is identical to the one shown in FIGS. 2A and 2B.

The recording material 3 in the tank 122 is melted by heating with any one of the head temperature control heaters 100a–103a is supplied through an ink supply conduit 122 to a liquid chamber 121b in the head 121 and then ejected out of the ejection outlet 121c. The supply of the recording material 3 from the tank 122 is performed by surface tension of the recording material 3 and wetting of recording head members with the recording material 3. A lid 140 is disposed to cover an ink supply opening 122a of the tank 122 and is opened for replenishing fresh solid recording material when the shortage of the recording material 3 in the tank 122 is detected by an ink amount sensor (not shown). The recording material in its solid state may assume any shape such as those of pellets in the form of cylinder or tablet, granules or powder.

Figure 17:
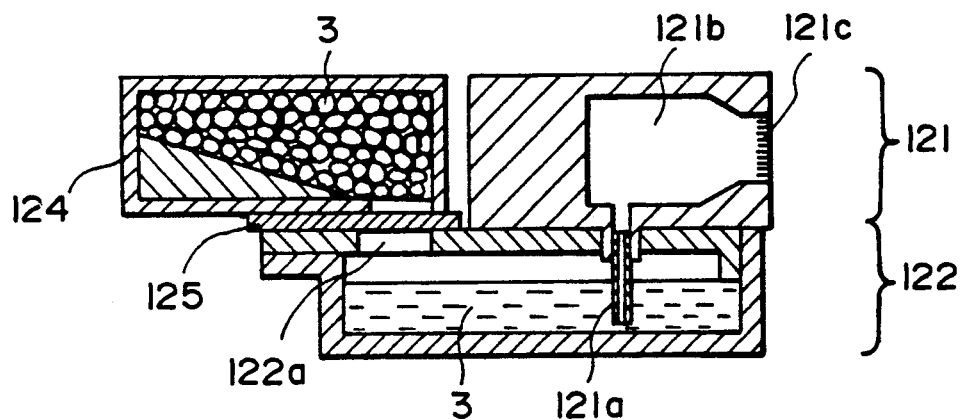

It is possible to use an ink cartridge 124 as shown in FIG. 17 for replenishing the recording material in view of easiness of handling and so as to prevent soiling of hands or surroundings in the apparatus. In FIG. 17, the ink cartridge 124 is filled with a granular recording material 3. When the ink shortage in the tank 122 is detected, a lid 125 is opened, and a prescribed amount of the granular recording material 3 is replenished into the tank 122. When the recording material in the ink carriage is used up, the cartridge is removed and a fresh ink cartridge is loaded.

Further, the entirety of a tank-equipped recording head as shown in FIG. 16 or FIG. 17 can be made an exchangeable recording head cartridge. In this instance, the recording head 121 and the heaters 100a–103a may be supplied with electricity by connecting an electrical connecting part disposed on the carriage 104 with an electrical connecting part disposed on the recording head cartridge at the time of loading the cartridge.

Figure 21:
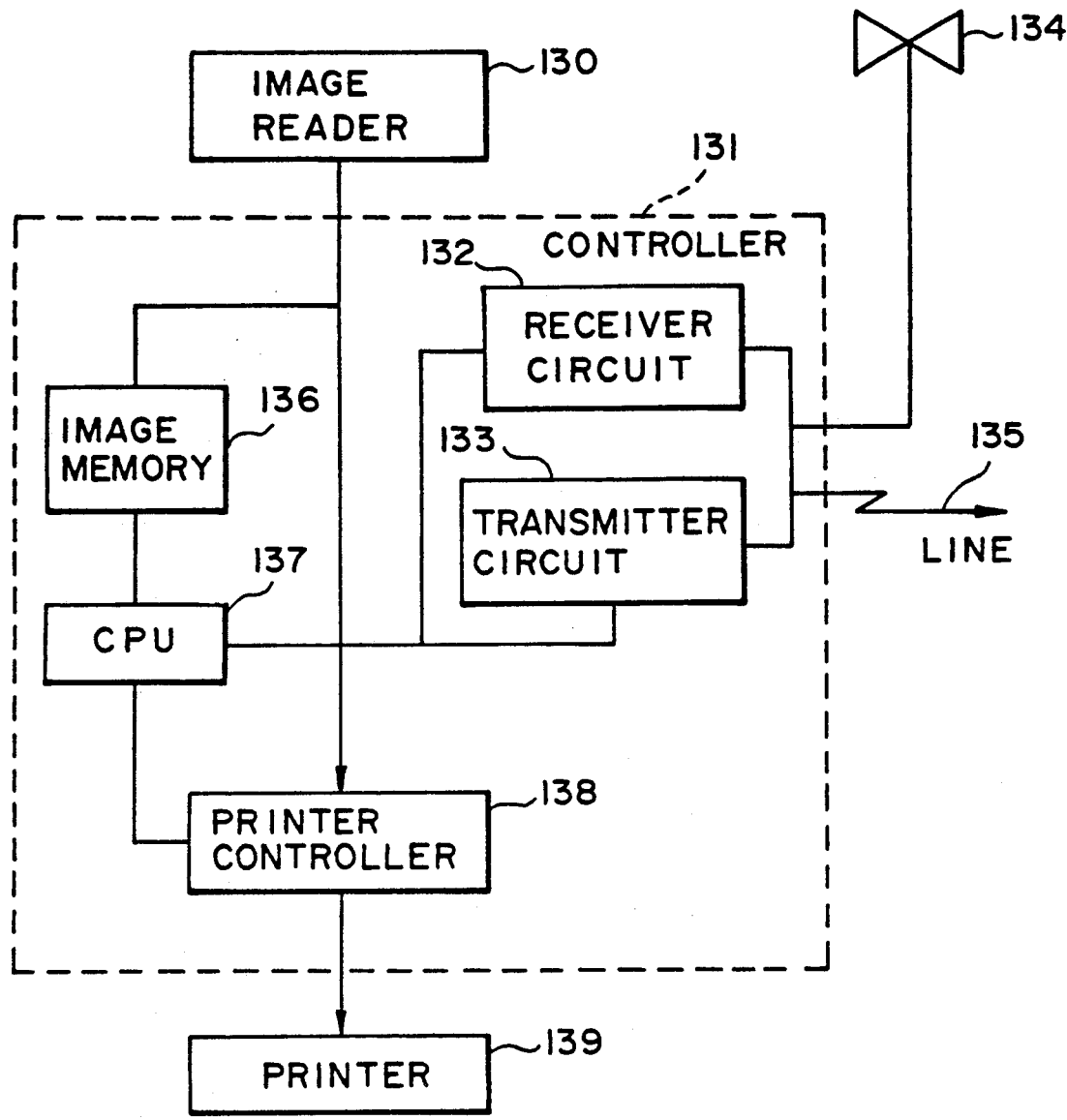
FIG. 21 is a block diagram of a facsimile apparatus including a recording apparatus according to the invention.
Figure 22:
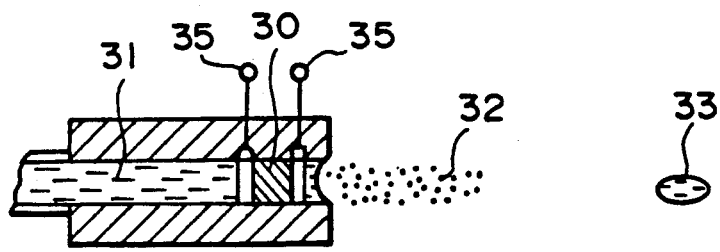
FIG. 22 is a sectional view for illustrating a known recording method.
Figure 25:
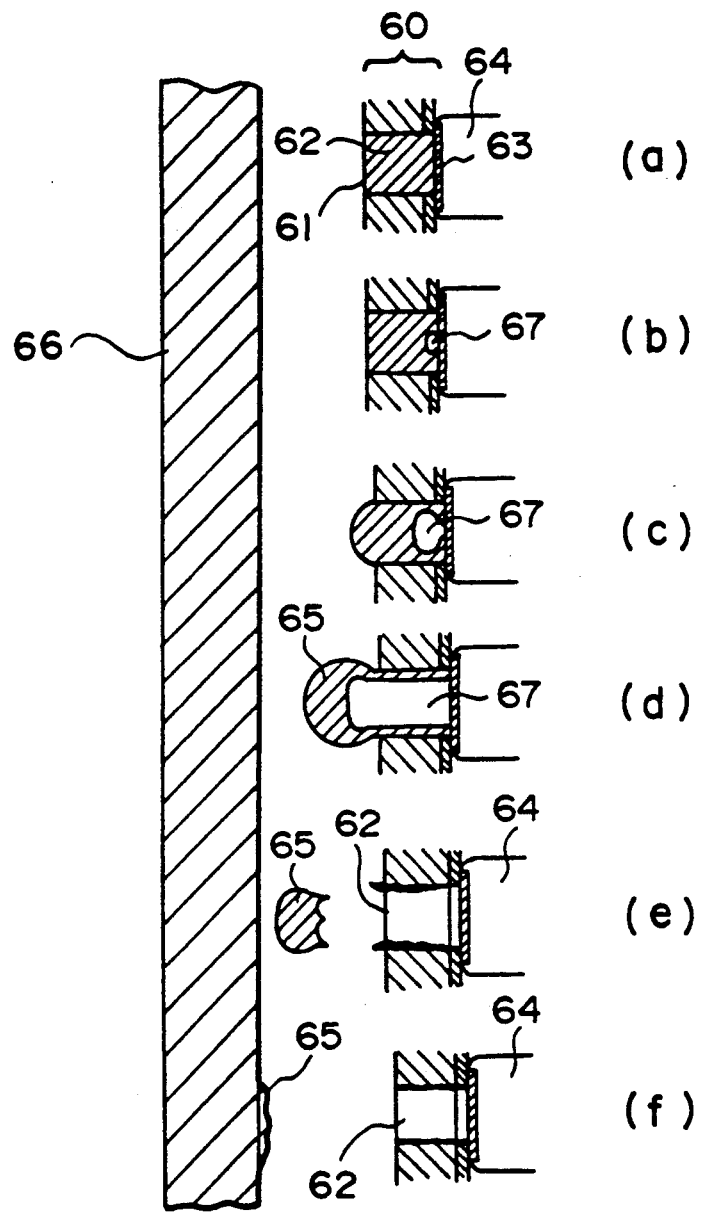
FIG. 25 shows a set of sectional views for illustrating still another known recording method.

The recording apparatus according to the present invention may be suitably used, for example, as a printer for a personal computer or a word processor. It is also possible to use the recording apparatus as a printer 139 in a facsimile apparatus shown in FIG. 21 by a block diagram. Referring to FIG. 21, a controller 131 controls an image reader (or image reading unit) 130 and a printer 139. The entirety of the controller 131 is regulated by a CPU 137. Data read from the image reader 130 is transmitted through a transmitter circuit 133 to a remote terminal such as another facsimile machine. On the other hand, data received from a remote terminal is transmitted through a receiver circuit 132 to a printer 139. An image memory 136 stores prescribed image data. A printer controller 138 controls the printer 139. A telephone handset 134 is connected to the receiver circuit 132 and the transmitter circuit 133.

More specifically, image data received from a line (or circuit) 135 is demodulated by means of the receiver circuit 132, and sequentially stored in the image memory 136. When image data corresponding to at least one page is stored in the image memory 136, image recording or output is effected with respect to the corresponding page. The CPU 137 reads image data corresponding to one page from the image memory 136, and transmits the decoded data corresponding to one page to the printer controller 138. When the printer controller 138 receives the image data corresponding to one page from the CPU 137, the printer controller 138 controls the printer 139 so that image data recording corresponding to the page is effected. During the recording by the printer 139, the CPU 137 receives another image data corresponding to the next page.

Hereinbelow, the present invention will be described based on Examples.

EXAMPLE 1

Image formation (recording) was performed by using an apparatus shown in FIG. 1 equipped with a recording head identical to the one shown in FIGS. 2A and 2B. The recording apparatus shown in FIG. 1 was further provided with a microscope 16 as shown in FIG. 10 for observation of bubbles generated in the recording material.

Referring to FIG. 2, the recording head was composed by disposing walls 8 on a substrate 1 so as to define liquid paths (nozzles) 15, a transparent ceiling plate 4 contacting the walls and heaters 2 each provided to one of the liquid paths. The heaters 2 are energized through electrodes (not shown) depending on image signals. A nozzle defining the liquid path 15 and provided with an ejection outlet 5 was composed to have a height of 27 microns and a width of 40 microns and was provided with a heater 2 having a width of 32 microns and a length of 40 microns. The heater 2 was disposed at a position giving a distance of 20 microns from its end closest to the ejection outlet 5, and 44 nozzles were disposed at a rate of 400 nozzles/inch.

| | |
|---|---|
| C.I. Solvent Black 3 | 5.0 wt. parts |
| Acetamide | 73.0 wt. parts |
| (Tm = 82° C., Tb = 222° C., Tf = 37° C.) | |
| Paraffin wax | 22.0 wt. parts |
| (Tm = 69° C., Tf = 65° C.) | |
| ("HNP-11", mfd. by Nihon Seiro K.K.) | |

The above ingredients were stirred in a vessel at 95° C. to be uniformly mixed in solution and filtrated under heating through a teflon filter having a pore diameter of 0.45 micron to obtain a normally solid ink after cooling. The ink was supplied to a recording head heated at 95° C. through its ink supply opening and used for ejection.

The heater 2 of the recording head was driven by applying pulse voltages having an amplitude of 16.0 volts and a pulse width of 25 micro-second at a drive frequency of 1 kHz.

The ink was discharged through successively disposed 16 nozzles among the 44 nozzles and the appearance thereof was observed from above the transparent ceiling plate 4 by using a pulse light source and a microscope, whereby it was confirmed that a bubble communicated with the ambience after about 3 micro-second from the start of the bubble creation to eject a droplet at a speed of about 9 m/sec.

Then, image signals giving a checker pattern having white and black square elements alternating at respective pixels were supplied to the 16 heaters 2 to eject the ink onto plain paper (commercially available copying paper). The resultant image was quickly fixed and was not disordered by hand rubbing at 5 seconds after the recording.

EXAMPLE 2

Image formation was conducted by using the same recording apparatus including the recording head under the same driving conditions as in Example 1 and using a normally solid ink as follows.

| | |
|---|---|
| C.I. Solvent Black 3 | 3.0 wt. parts |
| ε-Caprolactam | 81.0 wt. parts |
| (Tm = 69° C., Tf < 30° C.) | |
| Microcrystalline wax | 16.0 wt. parts |
| (Tm = 84° C., Tf = 79° C.) | |
| ("Hi-Mic 1080", mfd. by Nihon Seiro K.K.) | |

A normally solid ink was prepared by melting the above ingredients at 100° C. otherwise in the same manner as in Example 1. The resultant ink was used for observation and image formation by supplying it into the recording head heated at 100° C. otherwise in the same manner as in Example 1.

As a result of the observation, the bubble generated in the ink communicated with the ambience after about 3 micro-second from the commencement of the ink generation and the ink droplet was ejected at a speed of about 8 m/sec. As a result of the checker pattern image formation, the resultant image was quickly fixed and was not disordered by hand rubbing at 5 seconds after the recording.

EXAMPLE 3

Image formation was conducted by using the same recording apparatus including the recording head under the same driving conditions as in Example 1 and using a normally solid ink as follows.

| | |
|---|---|
| C.I. Solvent Black 3 | 3.0 wt. parts |
| N-Oxymethylacetamide | 87.0 wt. parts |
| (Tm = 51° C., Tb = 205° C., Tf = 32° C.) | |
| Acetamide | 10.0 wt. parts |
| (Tm = 82° C., Tb = 222° C., Tf = 37° C.) | |

A normally solid ink was prepared by using the above ingredients otherwise in the same manner as in Example 1. The resultant ink was used for observation and image formation in the same manner as in Example 1.

As a result of the observation, the bubble generated in the ink communicated with the ambience after about 3 micro-second from the commencement of the ink generation and the ink droplet was ejected at a speed of about 11 m/sec. As a result of the checker pattern image formation, the resultant image was quickly fixed and was not disordered by hand rubbing at 5 seconds after the recording.

EXAMPLE 4

Color image formation was performed by using a recording apparatus as shown in FIG. 15 including four recording heads each identical to the one used in Example 1. The four recording heads were supplied with yellow, magenta, cyan and black inks, respectively, prepared as follows.

| | |
|---|---|
| (Yellow) | |
| C.I. Solvent Yellow 116 | 3.0 wt. parts |
| Acetamide | 80.0 wt. parts |
| (Tm = 82° C., Tb = 222° C., Tf = 37° C.) | |
| Paraffin wax | 17.0 wt. parts |
| (Tm = 69° C., Tf = 65° C.) | |
| (Magenta) | |
| C.I. Solvent Red 218 | 4.0 wt. parts |
| Acetamide | 80.0 wt. parts |
| Paraffin wax | 16.0 wt. parts |
| (Cyan) | |
| C.I. Solvent Blue 70 | 5.0 wt. parts |
| Acetamide | 80.0 wt. parts |
| Paraffin wax | 15.0 wt. parts |
| (Black) | |
| C.I. Solvent Black 3 | 4.0 wt. parts |
| Acetamide | 80.0 wt. parts |
| Paraffin wax | 16.0 wt. parts |

Each color ink was prepared by stirring the respective ingredients at 95° C. for uniform mixing and filtrating the molten mixture through a teflon filter having a pore diameter of 0.45 micron, followed by cooling.

The respective color inks were supplied to the recording heads heated at 95° C. and used for ejection by applying to the respective heaters 2 pulse voltages having an amplitude of 16.0 volts, a pulse width of 2.5 micro-second and a frequency of 1 kHz.

As a result of observation of the discharge appearance in the same manner as in Example 1, the bubbles generated in the respective inks communicated with the ambience after about 3 micro-second from the commencement of the bubble generation, and the ejected ink speeds were about 11 m/sec for yellow, about 9 m/sec for magenta, about 9 m/sec for cyan and about 10 m/sec for black, respectively.

Then, full color image formation was performed by using the four recording heads to form a high-quality color image on plain paper (commercially available copying paper), which was quickly fixed and was not disordered by hand rubbing at 5 seconds after the recording.

EXAMPLE 5

9.5 wt. parts of acenaphthene (Tm=95° C., Tb=279° C., Tf=77° C.) was melted under heating at 110° C. and 0.5 wt. part of a black dye ("VALIFAST Black #3820", mfd. by Orient Kagaku Kogyo K.K.) was added thereto, followed by 1 hour of stirring and filtration. The filtrate was cooled to room temperature to obtain a normally solid recording material (ink).

EXAMPLE 6

9.5 wt. parts of 2-chloronaphthelene (Tm=60° C., Tb=256° C., Tf=56° C.) was melted under heating at 80° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 7

9.5 wt. parts of 2-bromonaphthalene (Tm=59° C., Tb=282° C., Tf=52° C.) was melted under heating at 80° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 8

8.0 wt. parts of 2,6-dimethylquinoline (Tm=60° C., Tb=267° C., Tf<30° C.) and 1.5 wt. parts of paraffin wax ("HNP 11", Tm=69° C., mfd. by Nihon Seiro K.K.) were melted and mixed under heating at 80° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 9

9.5 wt. parts of 2,6-dimethoxyphenol (Tm=56° C., Tb=258° C., Tf<32° C.) was melted under heating at 80° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 10

9.5 wt. parts of vaniline (Tm=83° C., Tb=284° C., Tf=37° C.) was melted under heating at 110° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 11

9.5 wt. parts of dibutylhydroxytoluene (Tm=70° C., Tb=265° C., Tf<30° C.) was melted under heating at 100° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 12

8.5 wt. parts of diphenylcarbonate (Tm=83° C., Tb=302° C., Tf=50° C.) and 1.0 wt. part of 1-octanol were melted and mixed under heating at 110° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 13

9.5 wt. parts of m-acetotoluidine (Tm=66° C., Tb=303° C., Tf<30° C.) was melted under heating at 90° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 14

6.5 wt. parts of phenyl benzoate (Tm=71° C., Tb=315° C., Tf<30° C.), 2.0 wt. parts of stearic acid (Tm=70° C., Tf=66° C.) and 1.0 wt. part of diethylene glycol were melted and mixed under heating at 100° C. and 0.5 wt. part of a black dye ("VALIFAST Black #3820") was added thereto, followed by 1 hour of stirring and filtration. The filtrate was cooled to room temperature to obtain a normally solid recording material.

EXAMPLE 15

9.5 wt. parts of 1-naphthol (Tm=96° C., Tb=279° C., Tf=80° C.) was melted under heating at 120° C. and 0.5 wt. part of a black dye ("VALIFAST Black #3820") was added thereto, followed by 1 hour of stirring and filtration. The filtrate was cooled to room temperature to obtain a normally solid recording material.

The normally solid recording materials prepared in the above Examples 5-15 were used for recording on plain paper (commercially available copying paper) and observation of bubble generation and ink ejection in the same manner as in Example 1 by using an apparatus shown in FIG. 1 equipped with a recording head shown in FIGS. 2A and 2B under the same driving conditions of the heaters 2 while heating the tank 21, the ink supply passage 22 and the recording head 23 at different temperatures respectively shown in Table 1 appearing hereinafter by the temperature control means 26 shown in FIG. 1. More specifically, the recording was performed by ejecting each recording material (ink) through 16 nozzles successively disposed in parallel in the recording head 23 continuously for 1 hour, and the bubble generation performance was also observed through a microscope 16 as shown in FIG. 10 disposed above the recording head 23 shown in FIG. 1.

The results of the observation of the ejection states of the respective recording materials are shown in Table 1 wherein the ejection state is evaluated by the number of nozzles used for successfully ejecting the recording material among the 16 nozzles, e.g., 16/16 means that all the 16 nozzles were used for successively ejecting the recording material and 0/16 means that none of the nozzles were effectively used for ejecting the recording material.

Further, the anti-plugging performance of each recording material was evaluated by allowing the apparatus to stand for 12 hours after the recording without recording operation except for the drive of the temperature control means 26 and then resuming the recording to evaluate the ejection state. The results are also shown in Table 1.

TABLE 1

| | | Ejection state | |
|---|---|---|---|
| | Temperature (°C.) | After 1 hr of continuous drive | After 12 hrs of standing (anti-plugging) |
| Ex. 5 | 110 | 16/16 | 16/16 |
| Ex. 6 | 80 | 16/16 | 16/16 |
| Ex. 7 | 80 | 16/16 | 16/16 |
| Ex. 8 | 80 | 16/16 | 16/16 |
| Ex. 9 | 80 | 16/16 | 16/16 |
| Ex. 10 | 100 | 16/16 | 16/16 |
| Ex. 11 | 90 | 16/16 | 16/16 |
| Ex. 12 | 100 | 16/16 | 16/16 |
| Ex. 13 | 85 | 16/16 | 16/16 |
| Ex. 14 | 90 | 16/16 | 16/16 |
| Ex. 15 | 110 | 16/16 | 16/16 |

In all Examples 5-15 the ejection was stable and high-quality recording was effected at a high fixing speed. In all Examples 5-15 it was observed that the generated bubble communicated with the ambience about 3 micro-second after the start of the bubble generation.

EXAMPLES 16-24

The recording materials prepared in the above Examples 5, 7, 8 and 10-15 were used for recording on plain paper (commercially available recording paper) by using an apparatus shown in FIG. 1 but equipped with a recording head for a commercially available jet recording apparatus ("BJ-130J"). The recording head was driven at a frequency of 100 Hz by applying pulse voltages with an amplitude of 28.5 volts and a pulse width of 7 micro-second.

The tank 21, the ink supply passage 22 and the recording head 23 were heated at different temperatures shown in Table 2 appearing hereinafter for the respective recording materials. More specifically, the recording was performed by ejecting each recording material through 24 nozzles successively disposed in parallel among the total of 48 nozzles in the recording head 23 continuously for 1 hour, and the bubble generation performance was also observed through a microscope 16 as shown in FIG. 10 disposed above the recording head 23 shown in FIG. 1.

The results of the observation of the ejection states of the respective recording materials are shown in Table 2 wherein the ejection state is evaluated by the number of nozzles used for successfully ejecting the recording material among the 24 nozzles, e.g., 24/24 means that all the 24 nozzles were used for successively ejecting the recording material and 0/24 means that none of the nozzles were effectively used for ejecting the recording material.

Further, the anti-plugging performance of each recording material was evaluated by allowing the apparatus to stand for 24 hours after the recording without recording operation except for the drive of the temperature control means 26 and then resuming the recording to evaluate the ejection state. The results are also shown in Table 2.

COMPARATIVE EXAMPLE 1

9.5 wt. parts of 2,2-dimethyl-1-propanol (Tm=56° C., Tb=114° C., Tf=35° C.) was melted under heating at 80° C. and 0.5 wt. part of a black dye ("VALIFAST Black #3820", mfd. by Orient Kagaku Kogyo K.K.) was added thereto, followed by 1 hour of stirring and filtration. The filtrate was cooled to room temperature to obtain a normally solid recording material (ink).

COMPARATIVE EXAMPLE 2

9.5 wt. parts of diacetamide (Tm=79° C., Tb=218° C., Tf=45° C.) was melted under heating at 110° C. and 0.5 wt. part of a black dye ("VALIFAST Black #3820") was added thereto, followed by 1 hour of stirring and filtration. The filtrate was cooled to room temperature to obtain a normally solid recording material.

COMPARATIVE EXAMPLE 3

9.5 wt. parts of 2-naphthyl phenyl ketone (Tm=83° C., Tb=398° C., Tf=70° C.) was melted under heating at 110° C. and 0.5 wt. part of a black dye ("VALIFAST Black #3820") was added thereto, followed by 1 hour of stirring and filtration. The filtrate was cooled to room temperature to obtain a normally solid recording material.

The recording materials prepared in the above Comparative Examples 1-3 were respectively evaluated in the same manner as in Examples 16-24. The results are also shown in Table 2.

Figure 18:
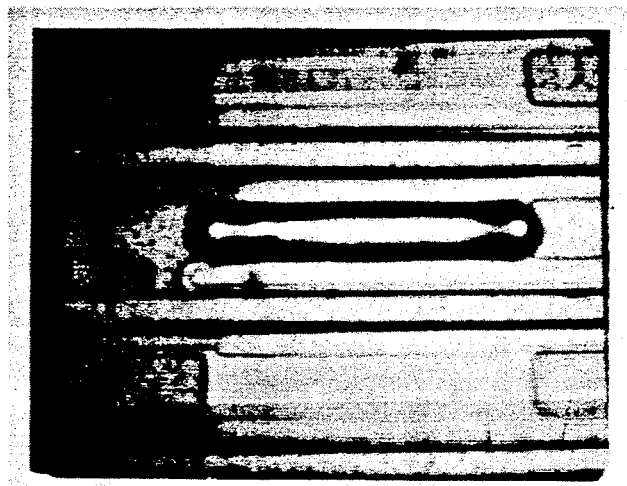
FIG. 18 is a microscopic photograph taken from above a heater showing a bubble forming state in Example 8.
Figure 19:
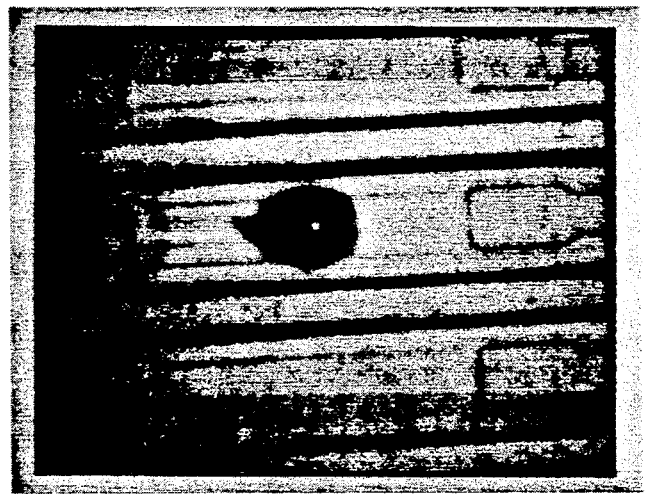
FIG. 19 is a microscopic photograph taken from above a heater showing a bubble forming state in Comparative Example 3.

For reference, the bubble formation states in the recording head in Example 18 and Comparative Example 3 at their respective maximum bubble forming states were photographed through a microscope to obtain pictures reproduced herein as FIGS. 18 and 19, respectively, at a magnification of 360.

TABLE 2

| | | | | Ejection state | |
|---|---|---|---|---|---|
| Ex. No. | Recording material prepared in | Temperature (°C.) | Bubble-forming state** | After 1 hr of drive | After 24 hr of standing |
| 16 | Ex. 5 | 110 | A | 24/24 | 24/24 |
| 17 | Ex. 7 | 80 | B | 24/24 | 24/24 |
| 18 | Ex. 8 | 80 | A | 24/24 | 24/24 |
| 19 | Ex. 10 | 100 | B | 24/24 | 24/24 |
| 20 | Ex. 11 | 90 | A | 24/24 | 24/24 |
| 21 | Ex. 12 | 100 | C | 24/24 | 24/24 |
| 22 | Ex. 13 | 85 | C | 24/24 | 24/24 |
| 23 | Ex. 14 | 90 | C | 24/24 | 24/24 |
| 24 | Ex. 15 | 110 | C | 24/24 | 24/24 |
| Comp. Ex. 1 | | 75 | D | 0/24 | 0/24 |
| Comp. Ex. 2 | | 100 | E | 12/24 | 4/24 |
| Comp. Ex. 3 | | 105 | F | 0/24 | 0/24 |

**Bubble forming state
A: The bubble size was larger than the heater.
B: The bubble size was nearly equal to the heater.
C: The bubble size was almost ½ of the heater.
D: A large number of small bubbles were generated.
E: Plural bubbles having a size below ¼ of the heater were generated.
F: The bubble size was smaller than ¼ of the heater.

EXAMPLE 25

70 wt. parts of phthalide (Tm=75° C., Tf<30° C.) and 27 wt. parts of paraffin wax (Tm=76° C., Tf=72° C., "HNP-9", mfd. by Nihon Seiro K.K.) were melt-mixed under heating and 3 wt. parts of C.I. Solvent Black 3 was added thereto, followed by stirring for 3 hours, filtration through a filter having a pore size of 1 micron and cooling to room temperature to obtain a normally solid recording material.

EXAMPLE 26

60 wt. parts of 2,2-diethyl-1,3-propanediol (Tm=62° C., Tf=38° C.) and 37 wt. parts of ester wax (Tm=81° C., Tf=74° C., "Hoechst Wax E", available from Hoechst Japan K.K.) were melt-mixed under heating and 3 wt. parts of C.I. Solvent Black 3 was added thereto, followed by stirring for 3 hours, filtration through a filter having a pore size of 1 micron and cooling to room temperature to obtain a normally solid recording material.

EXAMPLE 27

82 wt. parts of 8-quinolynol (Tm=75° C., Tf=38° C.) and 14 wt. parts of micro-crystalline wax (Tm=84° C., Tf=79° C., "Hi-Mic 1080", mfd. by Nihon Seiro K.K.) were melt-mixed under heating and 4 wt. parts of C.I. Solvent Black 3 was added thereto, followed by stirring for 3 hours, filtration through a filter having a pore size of 1 micron and cooling to room temperature to obtain a normally solid recording material.

EXAMPLE 28

60 wt. parts of N-tert-butylethanolamine (Tm=42° C., Tf<30° C.) and 37 wt. parts of candelilla wax (Tm=70° C., Tf=66° C., "Candelila Special", mfd. by Noda Wax K.K.) were melt-mixed under heating and 3 wt. parts of C.I. Solvent Black 3 was added thereto, followed by stirring for 3 hours, filtration through a filter having a pore size of 1 micron and cooling to room temperature to obtain a normally solid recording material.

EXAMPLE 29

68 wt. parts of o-vaniline (Tm=44° C., Tf<30° C.) and 29 wt. parts of candelilla wax (Tm=70° C., Tf=66° C., "Candelilla Special", mfd. by Noda Wax K.K.) were melt-mixed under heating and 3 wt. parts of C.I. Solvent Black 3 was added thereto, followed by stirring for 3 hours, filtration through a filter having a pore size of 1 micron and cooling to room temperature to obtain a normally solid recording material.

EXAMPLE 30

68 wt. parts of glycolic acid (Tm=76° C., Tf=33° C.) and 29 wt. parts of ester wax (Tm=81° C., Tf=74° C., "Hoechst Wax E", available from Hoechst Japan K.K.) were melt-mixed under heating and 3 wt. parts of C.I. Solvent Black 3 was added thereto, followed by stirring for 3 hours, filtration through a filter having a pore size of 1 micron and cooling to room temperature to obtain a normally solid recording material.

EXAMPLE 31

80 wt. parts of diacetylmonooxime (Tm=76° C., Tf=71° C.) and 16 wt. parts of microcrystalline wax (Tm=84° C., Tf=79° C., "Hi-Mic 1080", mfd. by Nihon Seiro K.K.) were melt-mixed under heating and 4 wt. parts of C.I. Solvent Black 3 was added thereto, followed by stirring for 3 hours, filtration through a filter having a pore size of 1 micron and cooling to room temperature to obtain a normally solid recording material.

EXAMPLE 32

68 wt. parts of acetoxime (Tm=62° C., Tf=59° C.) and 29 wt. parts of paraffin wax (Tm=76° C., Tf=72° C., "HNP-9", mfd. by Nihon Seiro K.K.) were melt-mixed under heating and 3 wt. parts of C.I. Solvent Black 3 was added thereto, followed by stirring for 3 hours, filtration through a filter having a pore size of 1 micron and cooling to room temperature to obtain a normally solid recording material.

The recording materials prepared in Examples 25-32 above were used for recording on plain paper (commercially available copying paper) by using the same apparatus including the recording head under the same drive conditions as in Example 1 except as follows.

In all the cases of using the recording materials of Examples 25-32, the tank 21, the ink supply passage 22 and the recording head 23 were heated at 90° C. by the temperature control means 26. The recording was performed by ejecting the recording material through successively disposed 24 nozzles among the total of 44 nozzles continuously for 1 hour, whereby no nozzles caused plugging in any case using the recording materials of Examples 25-32.

The anti-plugging performance of each recording material was further evaluated by allowing the apparatus to stand for 24 hours after the recording without recording operation except for the drive of the temperature control means 26 and then resuming the recording operation to evaluate the ejection state. As a result, no nozzles caused plugging in any case using the recording materials of Examples 25-32.

Each of the recorded images formed by using the recording materials of Examples 25-32 was rubbed by a filter paper ("No. 5C" (trade name) available from Toyo Roshi K.K.) to evaluate the fixation performance, whereby complete fixation was observed within 10 seconds so that no stain was observed on the filter paper at 10 seconds after the recording.

EXAMPLE 33

9.5 wt. parts of dibenzofuran (Tm=83° C., Tb=287° C., Tm−Tf=13° C.) was melted under heating at 95° C., and 0.5 wt. part of a black dye ("VALIFAST Black #3820", mfd. by Orient Kagaku Kogyo K.K) was added thereto, followed by stirring for 1 hour and filtration. The filtrate was cooled to room temperature to obtain a recording material.

EXAMPLE 34

6.5 wt. parts of 2-acetylpyrrole (Tm=90° C., Tb=220° C., Tm−Tf=29° C.) was melted under heating at 100° C., and 3.0 wt. parts of paraffin was ("HNP-11", mfd. by Nihon Seiro K.K., Tm=69° C., Tf=65° C.) and 0.5 wt. part of a black dye ("VALIFAST Black #3820") were added thereto, followed by stirring for 1 hour and filtration. The filtrate was cooled to room temperature to obtain a recording material.

EXAMPLE 35

9.5 wt. parts of 4-methylbiphenyl (Tm=50° C., Tb=267° C., Tm−Tf=8° C.) was melted under heating at 65° C., and 0.5 wt. part of a black dye ("VALIFAST for 1 hour and filtration. The filtrate was cooled to room temperature to obtain a recording material.

EXAMPLE 36

9.0 wt. parts of dimethyl oxalate (Tm=53° C., Tb=164° C., Tm−Tf=12° C.) was melted under heating at 65° C., and 0.5 wt. part of a black dye ("VALIFAST Black #3820") and 0.5 wt. part of 1-octanol were added thereto, followed by stirring for 1 hour and filtration. The filtrate was cooled to room temperature to obtain a recording material.

EXAMPLE 37

9.5 wt. parts of glutaric acid (Tm=97° C., Tb=303° C., Tm−Tf=14° C.) was melted under heating at 105° C., and 0.5 wt. part of a black dye ("VALIFAST Black #3820") was added thereto, followed by stirring for 1 hour and filtration. The filtrate was cooled to room temperature to obtain a recording material.

EXAMPLE 38

9.5 wt. parts of homocatechol (Tm=65° C., Tb=251° C., Tm−Tf=35° C.) was melted under heating at 75° C., and 0.5 wt. part of a black dye ("VALIFAST Black #3820") was added thereto, followed by stirring for 1 hour and filtration. The filtrate was cooled to room temperature to obtain a recording material.

EXAMPLE 39

9.5 wt. parts of cetyl alcohol (Tm=50° C., Tm−Tf=5° C.) was melted under heating at 65° C., and 0.5 wt. part of a black dye ("VALIFAST Black #3820") was added thereto, followed by stirring for 1 hour and filtration. The filtrate was cooled to room temperature to obtain a recording material.

EXAMPLE 40

4.8 wt. parts of ethylene carbonate (Tm=39° C., Tb=238° C., Tf<30° C.) and 4.8 wt. parts of 1,12-dodecanediol (Tm=82° C., Tm−Tf=5° C.) were melted under heating at 95° C., and 0.4 wt. part of a black dye ("VALIFAST Black #3820") was added thereto, followed by stirring for 1 hour and filtration. The filtrate was cooled to room temperature to obtain a recording material.

EXAMPLE 41

6.8 wt. parts of acetamide (Tm=82° C., Tb=222° C., Tf=37° C.) and 2.8 wt. parts of stearic acid (Tm=70° C., Tm−Tf=4° C.) were melted under heating at 95° C., and 0.4 wt. part of a black dye ("VALIFAST Black #3820") was added thereto, followed by stirring for 1 hour and filtration. The filtrate was cooled to room temperature to obtain a recording material.

EXAMPLE 42

7.2 wt. parts of tiglic acid (Tm=65° C., Tb=198° C., Tf=53° C.) and 2.4 wt. parts of ester wax (Tm=81° C., Tm−Tf=7° C., "Hoechst Wax E", available from Hoechst Japan K.K.) were melted under heating at 95° C., and 0.4 wt. part of a black dye ("VALIFAST Black #3820") was added thereto, followed by stirring for 1 hour and filtration. The filtrate was cooled to room temperature to obtain a recording material.

EXAMPLE 43

6.8 wt. parts of lupinine (Tm=69° C., Tb=162° C., Tf=49° C.) and 2.8 wt. parts of 1,2-dodecanediol (Tm=58° C., Tm−Tf=17° C.) were melted under heating at 80° C., and 0.4 wt. part of a black dye ("VALIFAST Black #3820") was added thereto , followed by stirring for 1 hour and filtration. The filtrate was cooled to room temperature to obtain a recording material.

EXAMPLE 44

7.2 wt. parts of o-terphenyl (Tm=58° C., Tb=332° C., Tf=40° C.) and 2.4 wt. parts of pentacosane (Tm=54° C., Tm−Tf=4° C.) were melted under heating at 95° C., and 0.5 wt. part of a black dye ("VALIFAST Black #3820") was added thereto, followed by stirring for 1 hour and filtration. The filtrate was cooled to room temperature to obtain a recording material.

EXAMPLE 45

6.8 wt. parts of 9-heptadecanone (Tm=53° C., Tb=252° C., Tf=45° C.) and 2.8 wt. parts of dimethyl isophthalate (Tm=69° C., Tm−Tf=26° C.) were melted under heating at 80° C., and 0.4 wt. part of a black dye ("VALIFAST Black #3820") was added thereto, followed by stirring for 1 hour and filtration. The filtrate was cooled to room temperature to obtain a recording material.

EXAMPLE 46

6.8 wt. parts of acetamide (Tm=82° C., Tb=213° C., Tf=37° C.) and 2.8 wt. parts of 8-quinolinol (Tm=75° C., Tm−Tf=37° C.) were melted under heating at 95° C., and 0.4 wt. part of a black dye ("VALIFAST Black #3820") was added thereto, followed by stirring for 1 hour and filtration. The filtrate was cooled to room temperature to obtain a recording material.

EXAMPLE 46

4.8 wt. parts of arachidic alcohol (Tm=65° C., Tb=369° C., Tf=48° C.) and 4.8 wt. parts of 1,12-dodecanediol (Tm=82° C., Tm−Tf=8° C.) were melted under heating at 95° C., and 0.4 wt. part of a black dye ("VALIFAST Black #3820") was added thereto, followed by stirring for 1 hour and filtration. The filtrate was cooled to room temperature to obtain a recording material.

The recording materials prepared in Examples 33–47 were respectively used for recording on 5 commercially available paper samples as recording papers (1)–(5) shown in Table 3 below by using the same apparatus including the recording head under the same drive conditions except for the case using the recording material prepared in Example 47 wherein the recording head was driven at a frequency of 1 kHz by applying pulse voltages with an amplitude of 18.0 volts and a pulse width of 2.5 micro-second.

TABLE 3

| Recording Paper | Trade Name |
|---|---|
| (1) | Gilbert Lancaster Bond |
| (2) | Xerox 4024 |
| (3) | Canon NP-DRY-DK |
| (4) | HAMMERMILL (9000-DP/Grain Long) |
| (5) | Toyo Roshi K.K., Filter Paper No. 5C |

During the recording, the tank 21, the ink supply passage 22 and the recording head 23 were heated at temperatures depending on the recording materials used as shown in Table 4 below.

TABLE 4

| Example No. | Temperature (°C.) |
|---|---|
| 33 | 100 |
| 34 | 100 |
| 35 | 70 |
| 36 | 70 |

TABLE 4-continued

| Example No. | Temperature (°C.) |
| --- | --- |
| 37 | 110 |
| 38 | 80 |
| 39 | 70 |
| 40 | 100 |
| 41 | 95 |
| 42 | 95 |
| 43 | 85 |
| 44 | 70 |
| 45 | 85 |
| 46 | 95 |
| 47 | 100 |

As a result of the recording using the above-prepared recording materials of Examples 33-47, the ejection was satisfactorily performed without nozzle plugging in all the cases.

On the other hand, the following results were obtained regarding the blotting and pile up of the recorded images obtained by the respective recording materials.

(i) The recording materials of Examples 33-37, 40-45 and 47 provided recorded images which were free from both blotting and pile-up on any of the recording papers (1)-(5).

(ii) The recording materials of Examples 38 and 46 provided recorded images accompanied with slight blotting at a practically acceptable level on the recording papers (4) and (5) and recorded images which were not substantially accompanied with noticeable blotting on the recording papers (1)-(3). The recorded images were free from pile-up on all the recording papers (1)-(5).

(iii) The recording material of Example 39 provided recorded images accompanied with some but practically acceptable level of pile-up of the recording material on all the recording papers (1)-(5). The recorded images were free from blotting.

What is claimed is:

1. A jet recording method, comprising:
   placing a normally solid recording material in a heat-melted state in a path defined by a nozzle having a sectional size and leading to an ejection outlet, and
   imparting to the melted recording material a thermal energy corresponding to a recording signal by a heater disposed along the path at a distance from the ejection outlet to generate a bubble, thus ejecting a droplet of the recording material out of the ejection outlet under action of the bubble;
   wherein the normally solid recording material contains a heat-fusible solid substance having a melting point Tm of 36°-150° C. and a boiling point Tb of 150°-370° C.; and
   the distance between the heater and the outlet, the sectional size of the nozzle and the thermal energy imparted by the heater are controlled so as to cause the bubble to communicate with ambience.

2. A method according to claim 1, wherein the nozzle has a width and a height equal to or smaller than the width respectively at a position along the path where the heater is disposed.

3. A method according to claim 1, wherein the bubble communicates with the ambience when the bubble has an internal pressure not higher than the ambient pressure.

4. A method according to claim 1, wherein the thermal energy is imparted by the heater disposed along the path so as to have a length with a front end and a rear end which are closest and farthest, respectively, to the ejection outlet, and the bubble is expanded to have a leading end having a distance $la$ from the front end of the heater and a trailing end having a distance $lb$ from the rear end of the heater, satisfying a relationship of $la/lb \geq 1$, immediately before the communication of the bubble with the ambience.

5. A method according to claim 4, wherein the distance la and lb satisfy a relationship of $la/lb \geq 2$.

6. A method according to claim 4, wherein the distance $la$ and $lb$ satisfy a relationship of $la/lb \geq 4$.

7. A method according to claim 1, wherein the heat-fusible solid substance has a boiling point Tb of 200°-340° C.

8. A method according to claim 1, wherein the melting point Tm and the solidifying point Tf satisfy a relationship of $Tm - Tf \leq 30°$ C.

9. A method according to claim 9, wherein the melting point Tm and the solidifying point Tf satisfy a relationship of $Tm - Tf \leq 15°$ C.

10. A method according to claim 9, wherein the melting point Tm and the solidifying point Tf satisfy a relationship of $Tm - Tf \geq 7°$ C.

11. A method according to claim 1, wherein said normally solid recording material contains the heat-fusible solid substance as a first heat-fusible solid substance and further contains a second heat-fusible solid substance having a melting point Tm and a solidifying point Tf satisfying a relationship of $Tm - Tf \leq 30°$ C.

12. A method according to claim 11, wherein said first heat-fusible solid substance has a boiling point Tb of 200°-340° C.

13. A method according to claim 11, wherein the melting point Tm and the solidifying point Tf of the second heat-fusible solid substance satisfy a relationship of $Tm - Tf \leq 15°$ C.

14. A method according to claim 11, wherein at least one of said first and second heat-fusible solid substances has a melting point Tm and a solidifying point Tf satisfying a relationship of $Tm - Tf \geq 7°$ C.

15. A jet recording method, comprising:
   providing a normally solid recording material containing a first heat-fusible solid substance having a melting point Tm of 40°-150° C. and a boiling point Tb of 260°-340° C., and a second heat-fusible solid substance having a melting point Tm and a solidifying point Tf satisfying a relationship of $Tm - Tf \leq 30°$ C., the first heat-fusible solid substance constituting 30-90 wt % of the normally solid recording material,
   placing the normally solid recording material in a heat-melted state in a path defined by a nozzle leading to an ejection outlet, and
   imparting to the melted recording material a thermal energy corresponding to a recording signal to generate a bubble, thus ejecting a droplet of the recording material out of the ejection outlet under action of the bubble.

16. A method according to claim 15, wherein the first heat-fusible solid substance has a melting point Tm and a solidifying point Tf satisfying a relationship of $Tm - Tf \leq 30°$ C.

17. A method according to claim 16, wherein the melting point Tm and the solidifying point Tf of the first heat-fusible solid substance satisfy a relationship of $Tm - Tf \leq 15°$ C.

18. A method according to claim 16, wherein the melting point Tm and the solidifying point Tf of the first heat-fusible solid substance satisfy a relationship of Tm−Tf≧7° C.

19. A method according to claim 15, wherein the melting point Tm and the solidifying point Tf of the second heat-fusible solid substance satisfy a relationship of Tm−Tf≦15° C.

20. A method according to claim 15, wherein at least one of said first and second heat-fusible solid substances has a melting Tm and a solidifying point Tf satisfying a relationship of Tm−Tf≧7° C.

* * * * *

UNITED STATES PATENT AND TRADEMARK OFFICE
CERTIFICATE OF CORRECTION

PATENT NO. : 5,270,730
DATED : December 14, 1993
INVENTOR(S) : Hisao YAEGASHI, et al.

It is certified that error appears in the above-indentified patent and that said Letters Patent is hereby corrected as shown below:

COLUMN 1:

Line 20, "4,410,899," should read --4,410,899--;
Line 21, "4,723,129" (first occurrence) should be deleted.

COLUMN 2:

Line 28, "result" (first occurrence) should be deleted.

COLUMN 3:

Line 8, "imparting" should read --imparting to--.

COLUMN 5:

Line 31, "the" (first occurrence) should read --In the--.

COLUMN 7:

Line 66, "in" should read --in a--.

UNITED STATES PATENT AND TRADEMARK OFFICE
CERTIFICATE OF CORRECTION

PATENT NO. : 5,270,730
DATED : December 14, 1993
INVENTOR(S) : Hisao YAEGASHI, et al.

It is certified that error appears in the above-indentified patent and that said Letters Patent is hereby corrected as shown below:

COLUMN 8:

Line 43, "$d^2Vb/dt^2<0$," should read --$d^2Vb/dt^2\leq 0$,--;
Line 67, "$d^2Vd/dt^2<0$," should read --$d^2Vd/dt^2\leq 0$,--.

COLUMN 12:

Line 52, "bubble" should read --bubbles--.

COLUMN 14:

Line 42, "dibutyhydroxytoluene," should read --dibutylhydroxytoluene,--.

COLUMN 15:

Line 42, "basic dyes" should read --basic dyes,--;
Line 64, "25, ,28," should read --25, 28,--.

COLUMN 16:

Line 50, "16 nozzles/mn." should read --16 nozzles/mm.--.

COLUMN 17:

Line 43, "is" should read --and is--.

UNITED STATES PATENT AND TRADEMARK OFFICE
CERTIFICATE OF CORRECTION

PATENT NO. : 5,270,730
DATED : December 14, 1993
INVENTOR(S) : Hisao YAEGASHI, et al.

It is certified that error appears in the above-indentified patent and that said Letters Patent is hereby corrected as shown below:

COLUMN 20:

Line 55, "micro-second" should read --micro-seconds--;
    Line 59, "micro-second" should read --micro-seconds--.

COLUMN 23:

Line 36, "micro-second" should read --micro-seconds--.

COLUMN 25:

Line 26, ""Candelila" should read --"Candelilla--.

COLUMN 26:

Line 60, "FAST for" should read --FAST Black #3820") was added thereto, followed by stirring for--.

COLUMN 28:

Line 48, "micro-second" should read --micro-seconds--.

UNITED STATES PATENT AND TRADEMARK OFFICE
CERTIFICATE OF CORRECTION

PATENT NO. : 5,270,730
DATED : December 14, 1993
INVENTOR(S) : Hisao YAEGASHI, et al.

It is certified that error appears in the above-indentified patent and that said Letters Patent is hereby corrected as shown below:

COLUMN 30:

Line 17, "claim 9," should read --claim 8,--;
Line 20, "claim 9," should read --claim 8,--.

COLUMN 32:

Line 5, "melting" should read --melting point--.

Signed and Sealed this

Thirtieth Day of August, 1994

Attest:

BRUCE LEHMAN

Attesting Officer    Commissioner of Patents and Trademarks